US011022292B2

(12) United States Patent
Saito et al.

(10) Patent No.: US 11,022,292 B2
(45) Date of Patent: Jun. 1, 2021

(54) LIGHTING DEVICE

(71) Applicant: CANON KABUSHIKI KAISHA, Tokyo (JP)

(72) Inventors: Keiichiro Saito, Tokyo (JP); Yutaka Yamamoto, Yokohama (JP); Toshiki Miyakawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/379,171

(22) Filed: Apr. 9, 2019

(65) Prior Publication Data

US 2019/0316768 A1   Oct. 17, 2019

(30) Foreign Application Priority Data

Apr. 11, 2018  (JP) .............................. JP2018-076459
Feb. 8, 2019   (JP) .............................. JP2019-021989

(51) Int. Cl.
*F21V 29/67*   (2015.01)
*F21V 5/04*    (2006.01)
(Continued)

(52) U.S. Cl.
CPC .............. *F21V 29/67* (2015.01); *F21V 5/045* (2013.01); *F21V 13/02* (2013.01); *F21V 14/02* (2013.01); *F21V 29/503* (2015.01); *F21V 29/504* (2015.01); *F21V 29/506* (2015.01); *F21V 23/003* (2013.01); *F21V 23/02* (2013.01); *F21Y 2115/10* (2016.08)

(58) Field of Classification Search
CPC ...... F21V 13/02; F21V 14/02; F21V 33/0052; F21V 29/67; F21V 29/60; F21V 29/504; F21V 5/008; F21V 5/045; F21Y 2115/10; G03B 15/041; G03B 15/05; G03B 15/02; G03B 2215/0514; G03B 2215/0589
See application file for complete search history.

(56) References Cited

U.S. PATENT DOCUMENTS 3,691,365 A * 9/1972 Sequerra ................ F21V 17/107
                                                    362/6
4,141,057 A * 2/1979 Dietrich ............. G03B 15/0442
                                                    362/18
(Continued)

FOREIGN PATENT DOCUMENTS

CN         1749848 A      3/2006
CN       107024820 A      8/2017
(Continued)

*Primary Examiner* — Peggy A Neils
(74) *Attorney, Agent, or Firm* — Canon U.S.A., Inc. IP Division

(57) ABSTRACT

A lighting device that protects a member related to light emission from heat associated with light emission includes a light source, a first optical member configured to transmit light emitted by the light source, a second optical member, arranged between the light source and the first optical member, configured to transmit light emitted by the light source, and an air-sending mechanism configured to send air suctioned from a first space that is an inner space on a side nearer to the light source than the second optical member and includes the light source to a second space that is a space between the first optical member and the second optical member.

20 Claims, 18 Drawing Sheets

(51) Int. Cl.
*F21V 13/02* (2006.01)
*F21V 14/02* (2006.01)
*F21V 29/504* (2015.01)
*F21V 29/506* (2015.01)
*F21V 29/503* (2015.01)
*F21V 23/02* (2006.01)
*F21Y 115/10* (2016.01)
*F21V 23/00* (2015.01)

(56) References Cited

U.S. PATENT DOCUMENTS

| | | | | |
|---|---|---|---|---|
| 5,285,232 A | * | 2/1994 | Taniguchi | G03B 15/05 362/12 |
| 5,895,128 A | * | 4/1999 | Kishimoto | G03B 15/05 396/182 |
| 7,683,395 B2 | * | 3/2010 | Huber | F21S 45/47 257/99 |
| 8,322,892 B2 | * | 12/2012 | Scordino | F21V 23/02 362/294 |
| 9,080,738 B2 | * | 7/2015 | Komatsu | F21V 9/04 |
| 10,228,118 B2 | * | 3/2019 | Yagi | F21V 29/504 |
| 2014/0252249 A1 | * | 9/2014 | Doros | F21V 17/002 250/504 R |

FOREIGN PATENT DOCUMENTS

| | | |
|---|---|---|
| CN | 107366867 A | 11/2017 |
| JP | 2012-32822 A | 2/2012 |
| JP | 2013-246342 A | 12/2013 |
| JP | 2016-024317 A | 2/2016 |
| JP | 2017-204400 A | 11/2017 |
| WO | 2012/107969 A1 | 8/2012 |

\* cited by examiner

LIGHTING DEVICE

BACKGROUND OF THE INVENTION

Field of the Invention

The present invention relates to a lighting device, and more particularly to a heat radiation mechanism of the lighting device.

Description of the Related Art

In lighting devices, since light sources generate heat by light emission, countermeasures have been conventionally taken to deal with the heat. Main methods for dealing with the heat include a method with use of a heat-resistant member as a member to which heat is transferred, a method of suppressing localized heat generation by facilitating heat radiation or thermal diffusion, and a method of limiting light emission by restrictions on firmware.

There is another method employed by a lighting device discussed in Japanese Patent Application Laid-Open No. 2012-32822. In the lighting device, a shielding wall that transmits light is arranged between a discharge tube and a Fresnel panel, and a plurality of ventilation ports for connecting a space between the Fresnel panel and the shielding wall to the outside air is arranged.

In the technique discussed in the Japanese Patent Application Laid-Open No. 2012-32822, however, since the outside air passes through the space between the shielding wall and the Fresnel panel, heat is not radiated near the discharge tube as a heat source. This may degrade durability of the discharge tube.

SUMMARY OF THE INVENTION

According to an aspect of the present invention, a lighting device includes a light source, a first optical member configured to transmit light emitted by the light source, a second optical member, arranged between the light source and the first optical member, configured to transmit light emitted by the light source, and an air-sending mechanism configured to send air suctioned from a first space that is an inner space on a side nearer to the light source than the second optical member and includes the light source to a second space that is a space between the first optical member and the second optical member.

Further features of the present invention will become apparent from the following description of embodiments with reference to the attached drawings. Each of the embodiments of the present invention described below can be implemented solely or as a combination of a plurality of the embodiments. Also, features from different embodiments can be combined where necessary or where the combination of elements or features from individual embodiments in a single embodiment is beneficial.

DESCRIPTION OF THE EMBODIMENTS

Figure 1A:
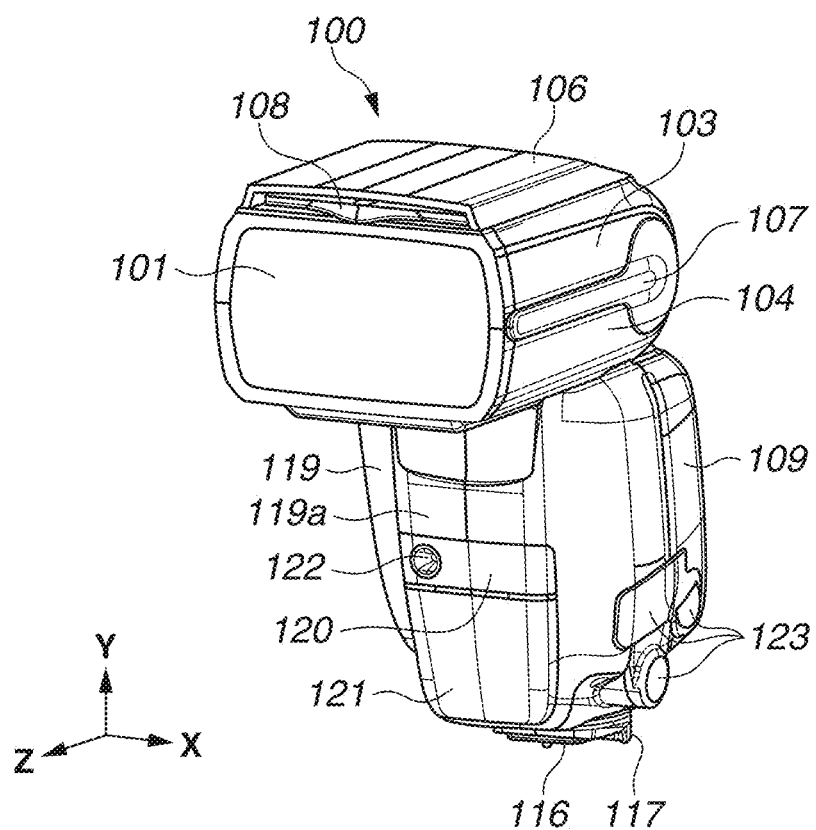
FIGS. 1A and 1B are external perspective views each illustrating a strobe device according to a first embodiment.

Hereinafter, embodiments are described with reference to the drawings. The same reference numerals are allocated to the same members in the drawings, and redundant descriptions thereof are omitted.

Figure 1B:
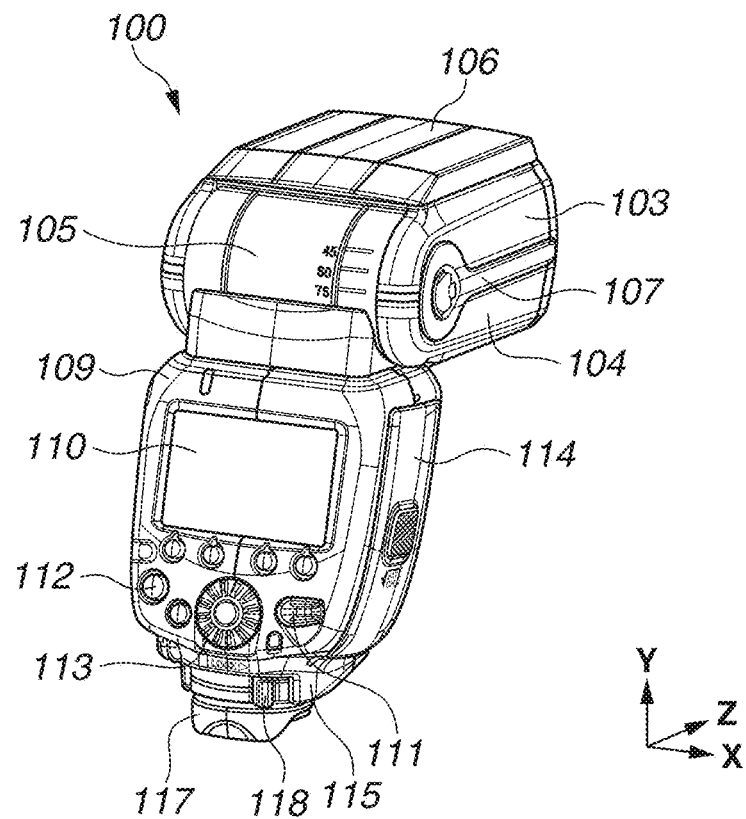

FIGS. 1A and 1B are external views each illustrating a strobe device 100 as a lighting device according to a first embodiment. FIG. 1A illustrates the strobe device 100 as seen from the front side on which an acrylic panel 101 as an optical panel is arranged, and FIG. 1B illustrates the strobe device 100 as seen from the back side (an operation unit side).

The strobe device 100 mainly include a light emission unit 100a (a first housing) and a control unit 100b (a second housing). The light emission unit 100a is arranged on an upper side of the strobe device 100, whereas the control unit 100b is arranged on a lower side of the strobe device 100. The light emission unit 100a includes a discharge tube 102 as a light source thereinside. The light emission unit 100a has a bounce function of changing an irradiation direction of irradiation light from the acrylic panel 101 by rotating with respect to the control unit 100b. Moreover, the light emission unit 100a mainly includes an upper cover 103, a lower cover 104, and a bounce case 105 having a cylindrical shape. Moreover, the upper cover 103 includes the wide panel cover 106 in which a wide panel 108 for widening light distribution at the time of light emission is stored. The wide panel 108 is an optical member having a light diffusion property by which irradiation light from the acrylic panel 101 is spread to a wider angle. When the wide panel 108 is used, the wide panel 108 is pulled out from the wide panel cover 106 and arranged so as to cover a front surface of the acrylic panel 101. A catch light sheet may be arranged as an auxiliary optical member instead of the wide panel 108. The catch light sheet reflects irradiation light in direction Z to provide a catch light effect on a subject when an irradiation direction of the irradiation light is directed upward (in a direction Y) by rotation of the light emission unit 100a. Or alternatively, both of the wide panel 108 and the catch light sheet may be arranged. Moreover, there is a side rubber 107 in a joint portion between the upper cover 103 and the lower cover 104. The side rubber 107 prevents slippage if the light emission unit 100a is manually rotated. The upper cover 103 and the lower cover 104 can be rotated in a vertical direction (a ZY in-plane direction) relative to the bounce case 105. The bounce case 105 can be rotated in a horizontal direction (an XZ in-plane direction) relative to the control unit 100b. Accordingly, the light emission unit 100a is rotatable relative to the control unit 100b, and operates such that an irradiation direction of light from the discharge tube 102 can be changed. Moreover, the control unit 100b supports the light emission unit 100a to control operations of the light emission unit 100a.

A rear cover 109 as an exterior member is arranged on the back side of the control unit 100b. The rear cover 109 includes a display portion 110 and operating portions such as a power switch 111, an operation button 112, and a dial 113, so that various functional settings can be made. A battery cover 114 is a cover that can be opened and closed so that a power battery 125 is loaded into the control unit 100b. A bottom cover 115 as an exterior member on the bottom side includes a leg portion 116 as a connecting portion by which the strobe device 100 is detachably attached to an accessory shoe of a camera (not illustrated) as an image capturing device. A drip-proof cover 117 is attached to the bottom cover 115 so as to enclose the leg portion 116. A lock lever 118 is rotated, so that the leg portion 116 can be fixed to the accessory shoe of the camera (not illustrated). A front cover 119 is an exterior member on the front side of the control unit 100b. In a middle portion of the front cover 119, a bulge portion 119a (a swelling portion) protruding frontward is provided. In the lower half of the bulge portion 119a, an optical pulse communication light receiving window 120, and an automatic focus (AF) auxiliary light irradiation window 121 are arranged. The AF auxiliary light irradiation window 121 assists the camera in focus detection during low brightness. The optical pulse communication light receiving window 120 includes a portion where an external light control light receiving sensor 122 is provided, and thus light can be controlled by the strobe device 100 alone, in addition to control of light by the camera (not illustrated). Various terminal covers 123 are arranged on the side opposite the battery cover 114 of the control unit 100b. A bracket fixation screw and a terminal such as an external power source terminal and a synchro-terminal are arranged inside the terminal covers 123. Moreover, a drip-proof packing (not illustrated) is arranged in a joint portion between the exterior members, and the terminal covers 123 and the drip-proof cover 117 have dust-proof drip-proof performance.

As described above, the control unit 100b according to the present embodiment, the side on which the bulge portion 119a is arranged is referred to as a front side (a front surface side), the side on which the display unit 110 and various operation units (111, 112, 113) are arranged is referred to as a back side (a rear surface side), and the side on which the leg portion 116 of the control unit 100b is arranged is referred to as a bottom side. In FIG. 1, a direction X corresponds to a horizontal direction of the control unit 100b, a direction Y corresponds to a vertical direction of the control unit 100b, and a direction Z corresponds to a front-rear direction of the control unit 1001b. In the following description, a horizontal direction, a vertical direction, and a front-rear direction of the strobe device 100 are substantially equal to the horizontal direction, the vertical direction, and the front-rear direction of the control unit 100b, unless otherwise stated.

Figure 2:
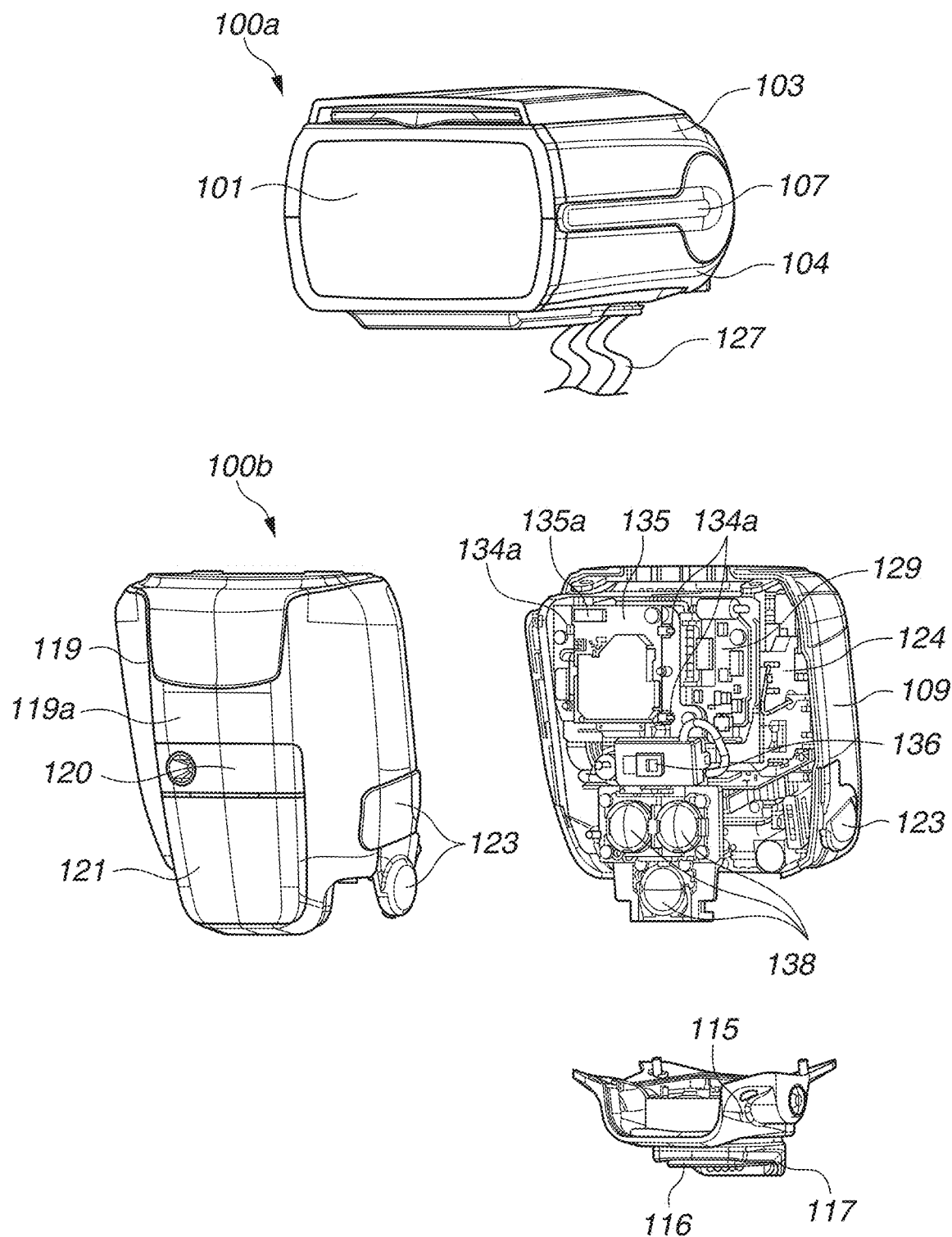
FIG. 2 is an exploded perspective view illustrating an inner portion of a control unit according to the first embodiment.
Figure 3:
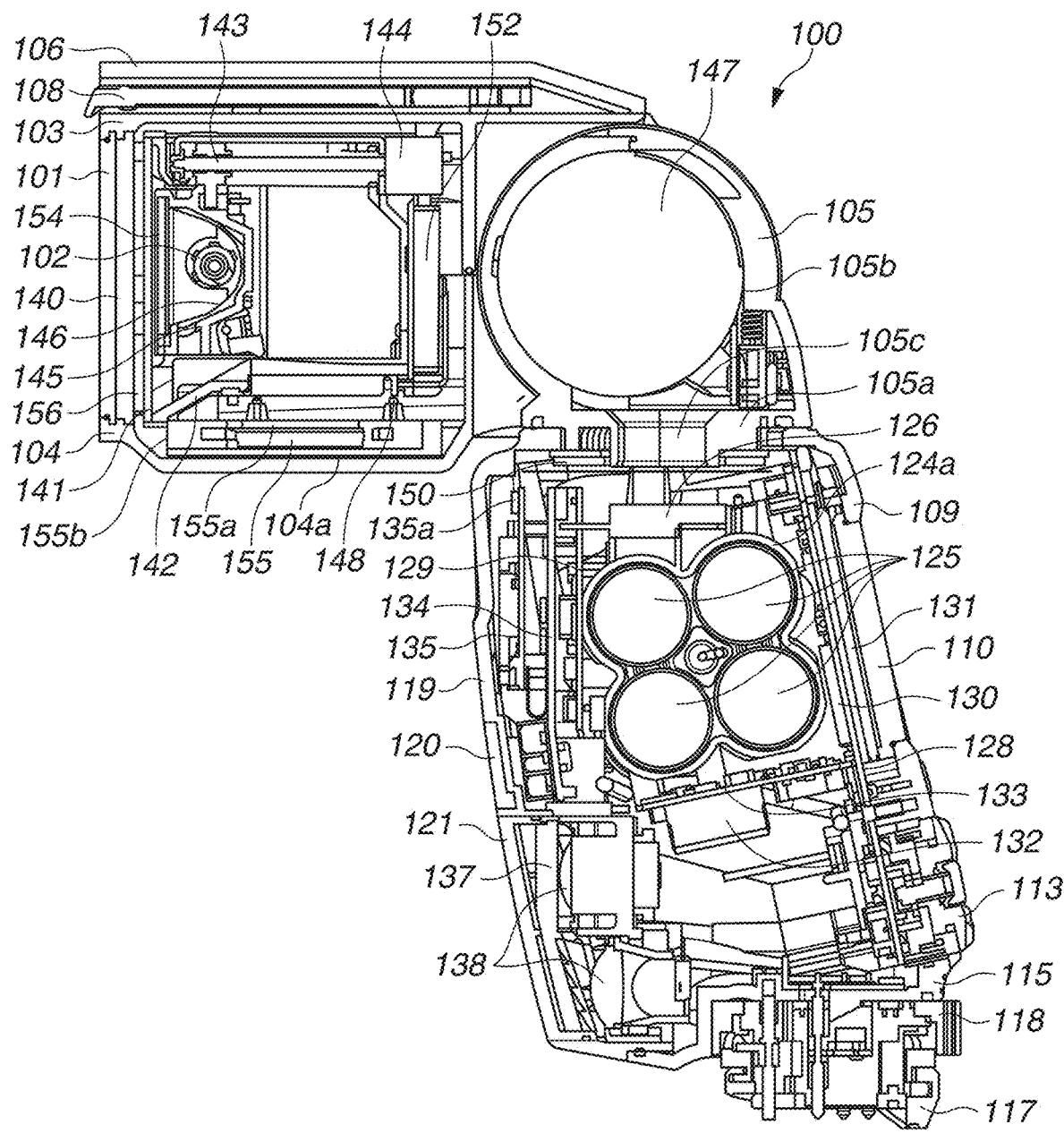
FIG. 3 is a longitudinal sectional view illustrating the strobe device according to the first embodiment.

Next, an internal configuration of the control unit 100b is described with reference to FIGS. 2 and 3. FIG. 2 is an exploded perspective view illustrating an inner portion of the control unit 100b as seen from the front side when the front cover 119 and the bottom cover 115 are detached from the control unit 100b. FIG. 3 is a sectional view illustrating a cross section perpendicular to a horizontal direction of the strobe device 100.

In a middle portion inside the control unit 100b, a battery case 124 is arranged. The battery case 124 has a battery storage portion 124a in which power batteries 125 (four AA batteries in the present embodiment) are stored and arranged in a substantially rectangular shape. Above the battery storage portion 124a, a predetermined space area 126 is provided between the battery storage portion 124a and a shaft portion 105a for horizontal rotation (for XZ in-plane rotation). The shaft portion 105a is arranged on the bottom of the bounce case 105 that protrudes from the light emission unit 100a. The space area 126 is provided to store a wire harness 127 in a loose state. The wire harness 127 is connected to a main substrate 128 and a sub-substrate 129 that are described below.

The main substrate 128 including a digital circuit is arranged on the back side of the battery case 124, that is, on the side of the rear cover 109. A central processing unit (CPU) 130 is mounted on the main substrate 128. Moreover, switching elements for the various operating portions, such as the power switch 111, arranged on the rear cover 109 are mounted on the main substrate 128. A liquid crystal display (LCD) 131 is arranged on an inner side of the display portion 110. On each of the bottom side and the front side of the battery case 124, a boost circuit substrate 133 including a boost transformer 132, and the sub-substrate 129 including a light emission control circuit with a field effect transistor (FET) (not illustrated) are attached.

On the front side of the battery case 124, a seat 134 and the sub-substrate 129 are attached so as to overlap each other. A wireless module 135 is attached to the front side of the seat 134 by a plurality of engaging claws 134a integrally formed with the seat 134. On an upper end side of the wireless module 135, a wireless communication antenna 135a (a chip antenna) is mounted. Moreover, a flexible substrate (not illustrated) to be connected to the main substrate 128 is connected to a connector (not illustrated) on a lower end side of the wireless module 135. An optical pulse light receiving sensor 136 is arranged in a position opposite the optical pulse communication light receiving window 120 arranged in a lower portion of the front cover 119. Moreover, the AF auxiliary light irradiation window 121 is arranged in a position opposite an AF auxiliary light unit 138 with a prism 137 therebetween, so that a single pattern to be ejected from the AF auxiliary light unit 138 is beam-split by the prism 137 into a plurality of segments, and the resultant segments are projected. In the present embodiment, three AF auxiliary light units 138 are installed.

Figure 4A:
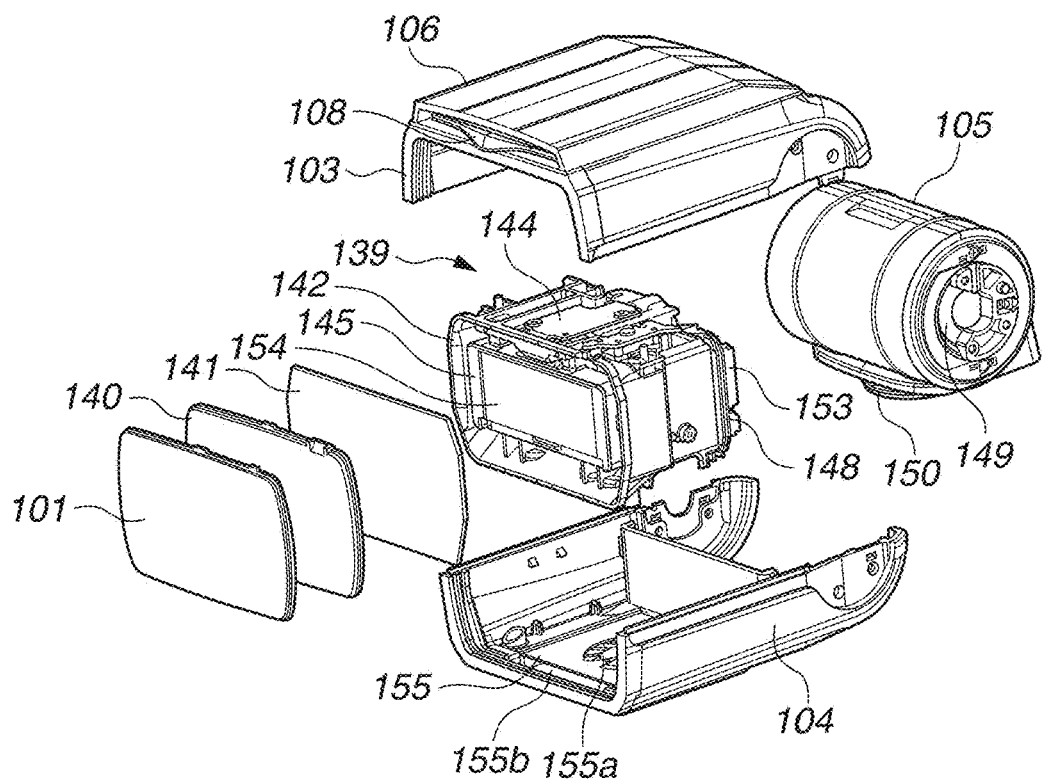
FIGS. 4A and 4B are exploded perspective views each illustrating an inner portion of a light emission unit according to the first embodiment.
Figure 4B:
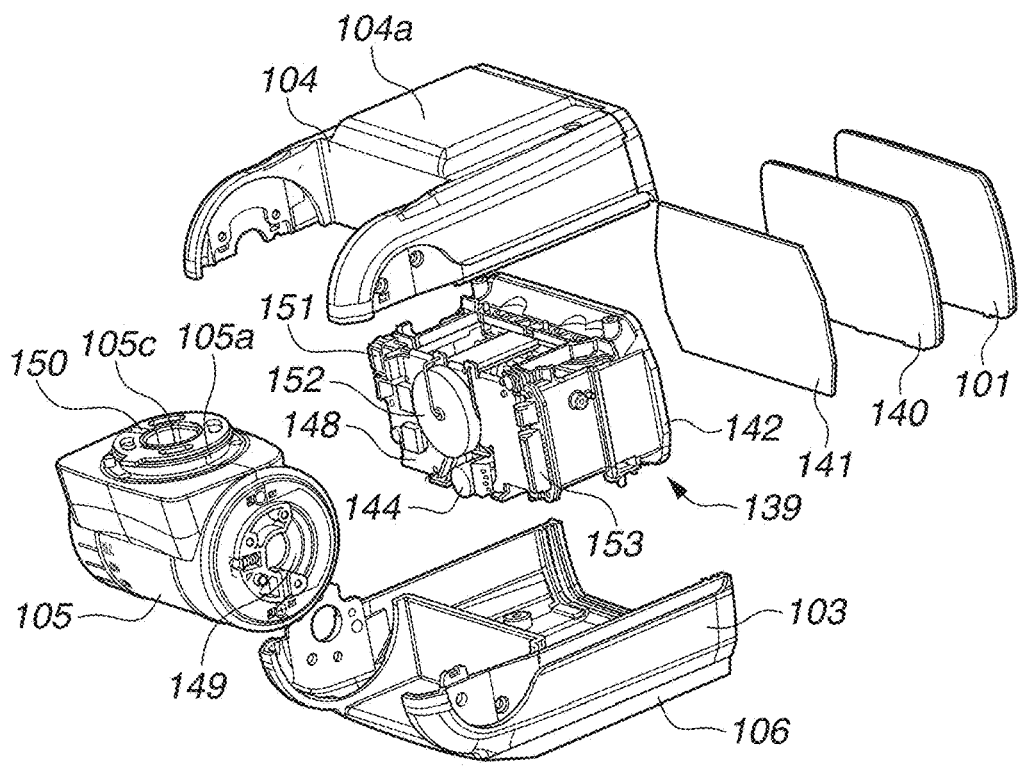

Next, internal configurations of the light emission unit 100a and the bounce case 105 are described with reference to FIGS. 3, 4A, and 4B. FIGS. 4A and 4B are exploded perspective views each illustrating an inner portion of the light emission unit 100a with the upper cover 103 and the lower cover 104 detached from the light emission unit 100a. FIG. 4A is a perspective view of the light emission unit 100a as seen from the top side, whereas FIG. 4B is a perspective view of the light emission unit 100a as seen from the bottom side.

The strobe device 100 according to the present embodiment has an electric zoom function of changing an irradiation angle based on a change in a relative distance between a Fresnel lens 140 and the discharge tube 102 in the inner side of the acrylic panel 101. The acrylic panel 101 has a function of adjusting color temperature and distribution of light emitted from the Fresnel lens 140, and a function of protecting the Fresnel lens 140 from external contact (including the functions of shock protection and heat protection). The Fresnel lens 140 includes a Fresnel lens portion having an optical action by which distribution of light emitted by the discharge tube 102 and incident thereto is changed. Such a Fresnel lens 140 is an optical lens serving as an optical member that transmits light emitted by the discharge tube 102. The present embodiment has been described using a two-configuration optical system including the acrylic panel 101 and the Fresnel lens 140. However, a single-configuration optical system in which a function of the acrylic panel 101 is added to the Fresnel lens 140 may be employed. The Fresnel lens 140 is made of a material such as resin and glass. The present embodiment has been described using an example in which the Fresnel lens 140 is used as an optical member having an optical action by which distribution of incident light emitted by the discharge tube 102 is changed. However, any optical members other than the Fresnel lens may be used as long as the optical member having the aforementioned optical action is used.

The portion inside the light emission unit 100a is mainly constituted by a light emission unit 139 forming a drive mechanism of the electric zoom function. A motor unit 144 including a lead screw 143 as an actuator is attached to an upper surface of a hood 142 that is a structure of the light emission unit 139. The discharge tube 102, a reflection umbrella 146, and a front glass 154 are attached to a reflection umbrella holder 145. The reflection umbrella 146 reflects light emitted from the discharge tube 102 frontward, and the front glass 154 blocks heat transferred from the discharge tube 102 to the Fresnel lens 140. The reflection umbrella 146 covers a portion from the upper side to the lower side of the discharge tube 102 through the rear side, and reflects light emitted in a rear direction and a vertical direction from the discharge tube 102 toward the Fresnel lens 140. The reflection umbrella holder 145 changes a relative distance between the Fresnel lens 140 and the discharge tube 102 in coordination with rotation of the lead screw 143. Accordingly, a light distribution angle of the irradiation light is changed. The present embodiment has been described using the strobe device 100 having a configuration in which a light distribution angle of irradiation light is changed by changing respective distances of the discharge tube 102 and the reflection umbrella 146 relative to the Fresnel lens 140 changes. However, the strobe device 100 can have a configuration in which a light distribution angle of irradiation light is changed by changing a distance between upper and lower refection surfaces of the reflection umbrella 146. The hood 142 diffusely reflects light that is not reflected in an irradiation direction of the light emission unit 139 by the reflection umbrella 146 in the irradiation direction of the light emission unit 139. Accordingly, the hood 142 has a shape in which size of an opening on a plane perpendicular to an optical axis of the irradiation light from the light emission unit 139 becomes larger as the opening becomes closer to the Fresnel lens 140 such that the light can be efficiently reflected in the irradiation direction of the light emission unit 139. Therefore, the hood 142 serves as a reflection member that surrounds the discharge tube 102 such that one portion of the hood 142 has an opening, and reflects one portion of light emitted from the discharge tube 102 in a direction of the opening.

A head substrate 148 connected to the discharge tube 102 is attached to the back surface of the hood 142 (on the side of the bounce case 105). Pieces of wiring (not illustrated) connected to the head substrate 148 are guided to a capacitor storage portion 105b through a rotation unit 149 between the bounce case 105 and the upper cover 103 having a rotation center that is a cylinder center of the bounce case 105. These pieces of wiring as well as wiring to be connected to a capacitor 147 form the wire harness 127. The wire harness 127 is pulled toward the outer side of the light emission unit 100a from a hole portion 105c formed in the middle of the shaft portion 105a. The wire harness 127 has a leading end to which a connector (not illustrated) is attached. The connector electrically connects a circuit of the head substrate 148 arranged inside the light emission unit 100a to the main substrate 128 and the sub-substrate 129 arranged inside the control unit 100b. Thus, the wire harness 127 electrically connects an electronic component such as the discharge tube 102 and the capacitor 147 arranged in the light emission unit 100a to each control substrate arranged in the control unit 100b. Moreover, the shaft portion 105a of the bounce case 105 has a leading end to which a rotation plate 150 is attached, and such a leading end has a function of regulating horizontal rotation of the light emission unit 100a at a predetermined angle. Moreover, the rotation plate 150 has a function of preventing the light emission unit 100a from coming off the control unit 100b.

The capacitor 147 (a main capacitor) is arranged in the capacitor storage portion 105b inside the bounce case 105 having a cylindrical shape. That is, the capacitor 147 is arranged on a rotation axis that is used if the light emission unit 100a is rotated in a vertical direction (a direction Y) relative to the control unit 100b. Moreover, the capacitor 147 is arranged in the vicinity of a connection portion between the light emission unit 100a and the control unit 100b. The capacitor 147 accumulates electric charge for emission of light by the discharge tube 102. With the accumulated electric charge, a high voltage necessary for emission of light by the discharge tube 102 is generated.

The discharge tube 102 starts discharging to emit light upon receipt of a trigger voltage from a trigger coil 151. The trigger coil 151 is mounted on the head substrate 148 and electrically connected to the reflection umbrella 146 by a trigger cable (not illustrated). The trigger voltage is applied to the discharge tube 102 from the trigger coil 151 via the reflection umbrella 146. On the head substrate 148, light emission related components such as the trigger coil 151 and a choke coil 152 forming a light emission circuit are mounted. Moreover, a connector 153 for connection of the wire harness 127 is mounted on the head substrate 148.

Between the capacitor 147 and the discharge tube 102, the choke coil 152 is electrically connected to the capacitor 147 and the discharge tube 102 to slow down an electric current to be supplied from the capacitor 147 to the discharge tube 102. This not only enables light emission control to be performed at the time of flat light emission but also reduces an electric load acting on the discharge tube 102.

A protection glass 141 is an optical member that transmits light emitted by the discharge tube 102. In an irradiation optical axis direction of the strobe device 100, the protection glass 141 is arranged between the discharge tube 102 and the Fresnel lens 140, and is spaced a predetermined distance apart from the Fresnel lens 140. Moreover, even if a relative position of the discharge tube 102 to the Fresnel lens 140 in the irradiation light axis direction is changed in association with electric zoom, a relative position of the protection glass 141 to the Fresnel lens 140 (a distance between the protection glass 141 and the Fresnel lens 140) in the irradiation light axis direction remains unchanged. Thus, the Fresnel lens 140 is protected from heat of the discharge tube 102 caused by light emission, and a flow path 156 through which air from a blower fan 155 described below passes is formed in a space between the Fresnel lens 140 and the protection glass 141. The front glass 154 described above has a function similar to the protection glass 141 in terms of protection of the Fresnel lens 140 by blocking heat that can be transferred from the discharge tube 102 to the Fresnel lens 140. However, in a case here a space where the discharge tube 102 is present is sealed by the front glass 154 and the reflection umbrella holder 145, the space is filled with heat from the discharge tube 102. Thus, the reflection umbrella holder 145 can have an opening portion. Alternatively, the front glass 154 may not be arranged since the protection glass 141 protects the Fresnel lens 140 from heat generated by emission of light by the discharge tube 102. The protection glass 141 can have an optical action by which distribution of light emitted by the discharge tube 102 and made incident thereto is adjusted. However, in a case where a lens portion is formed on a surface of the protection glass 141 on the side near the Fresnel lens 140, a flow of air between the Fresnel lens 140 and the protection glass 141 may be disturbed. Consequently, in a case where a lens portion is formed in the protection glass 141, the lens portion is desirably formed on the side near the discharge tube 102, instead of the side near the Fresnel lens 140.

Blower fan 155 is arranged in a fan storage portion 104a of the lower cover 104, and is thermally connected to the lower cover 104. Moreover, the blower fan 155 is electrically connected to the head substrate 148 by a wire harness (not illustrated). Rotation of the blower fan 155 is controlled based on a pulse width modulation (PWM) signal by the CPU 130 of the control unit 100b via the head substrate 148. The blower fan 155 includes a suction portion 155a arranged in a space on the side nearer to the light emission unit 139 than the protection glass 141. The suction portion 155a is arranged to suck (draw, pull or extract) air heated by the discharge tube 102. Then, the air is sent from an exhaust portion 155b (an air sending port) of the blower fan 155 toward the flow path 156 which is a space formed by the Fresnel lens 140 and the protection glass 141. The air having passed through the flow path 156 is exhausted (or expelled) to the motor unit 144 side, and flows into the light emission unit 139. Accordingly, the blower fan 155 sends the air in an inner space (a first space) including a light source to a space (a second space) between the Fresnel lens 140 and the protection glass 141. The inner space is provided on the side nearer to the light source than the protection glass 141.

Figure 5:
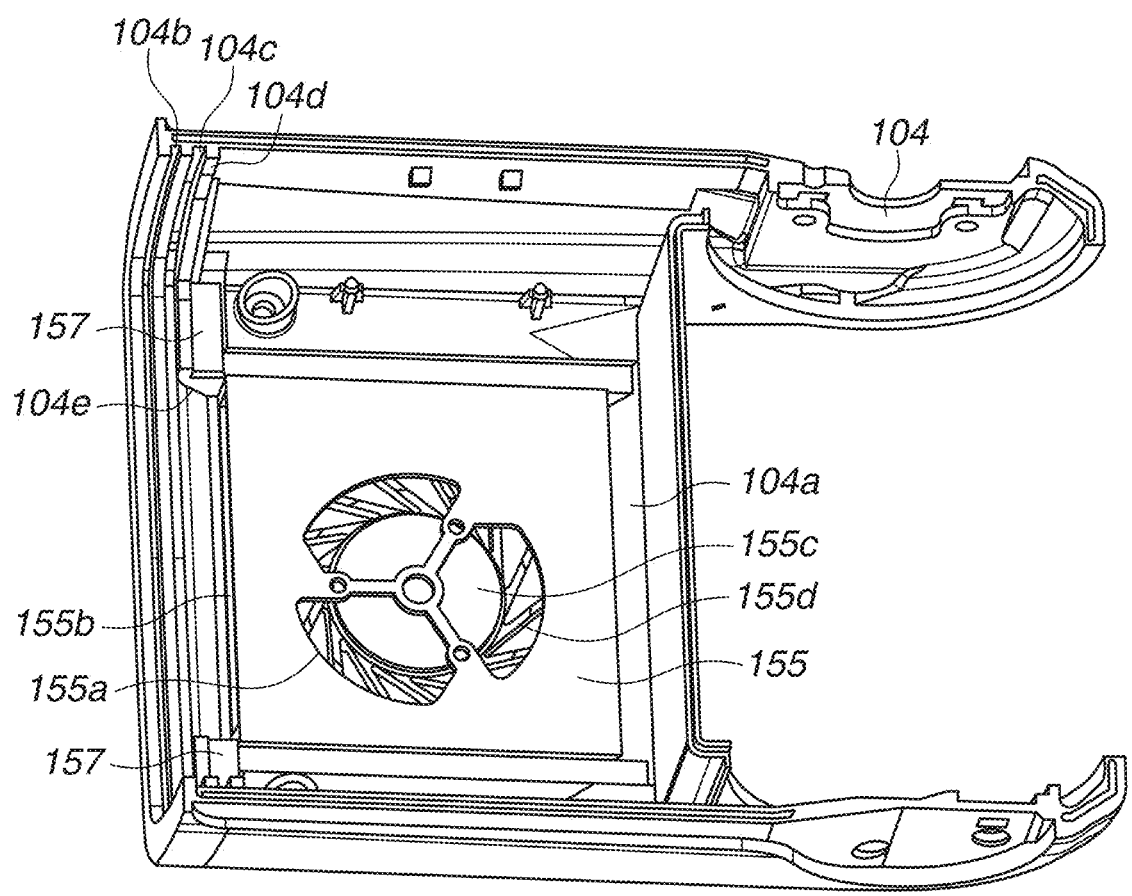
FIG. 5 is a perspective view illustrating a configuration in which a blower fan is attached to a lower cover according to the first embodiment.
Figure 6:
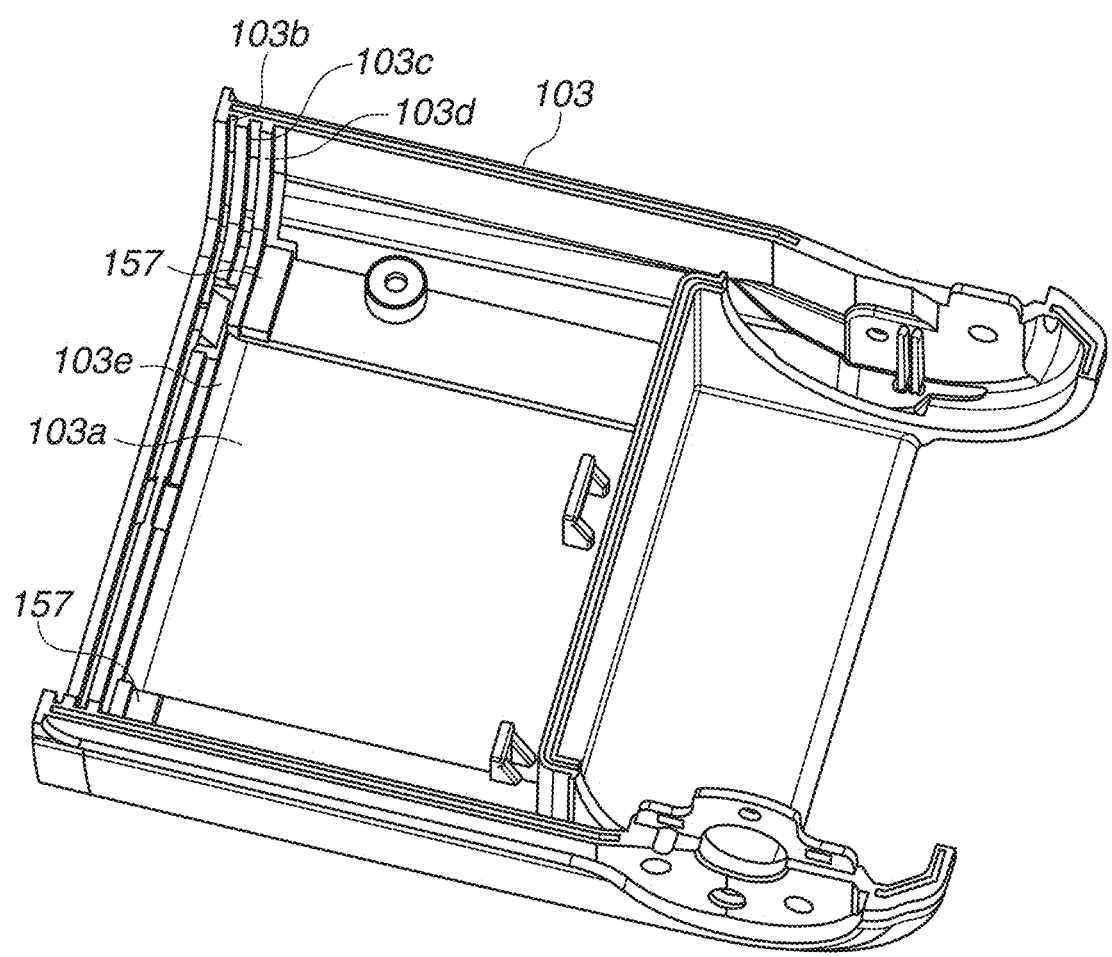
FIG. 6 is a perspective view illustrating a configuration of an outflow port of a flow path in an upper cover according to the first embodiment.
Figure 7:
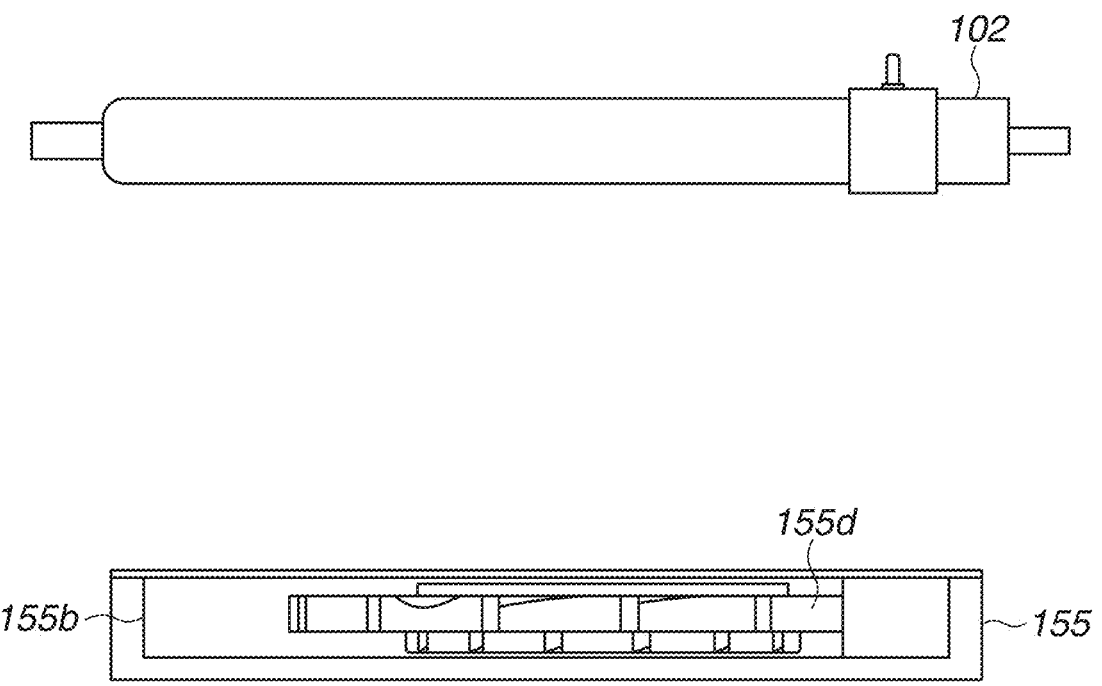
FIG. 7 is a front view illustrating a discharge tube and the blower fan according to the first embodiment.
Figure 8A:
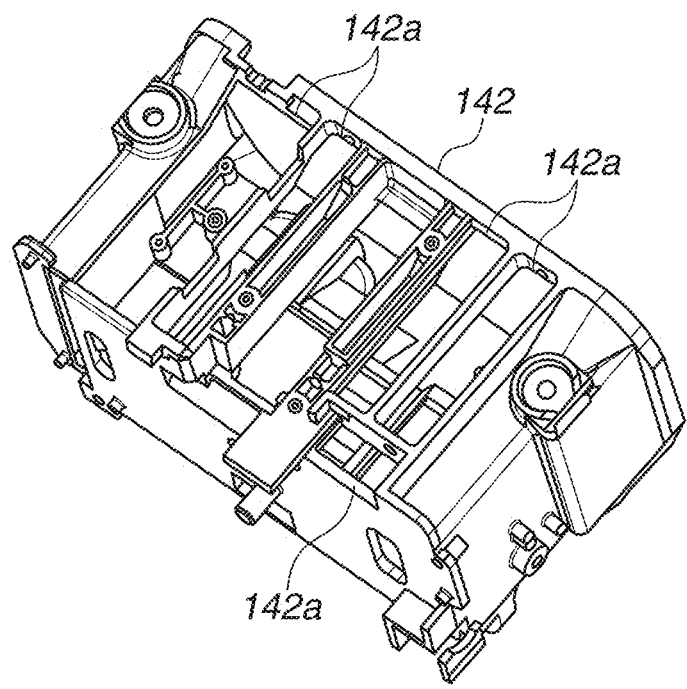
FIGS. 8A and 8B are perspective views each illustrating a configuration of an air path in a hood according to the first embodiment.
Figure 8B:
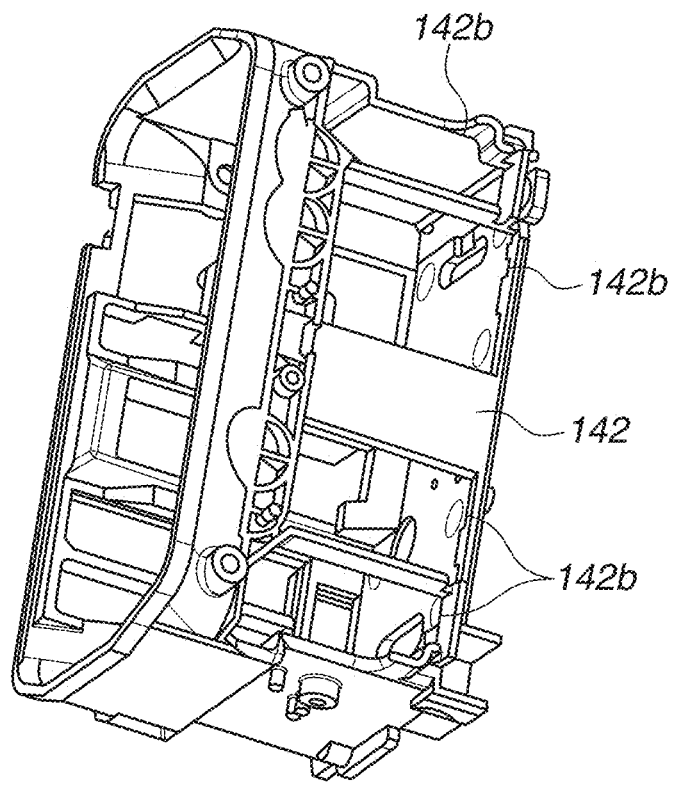
Figure 9:
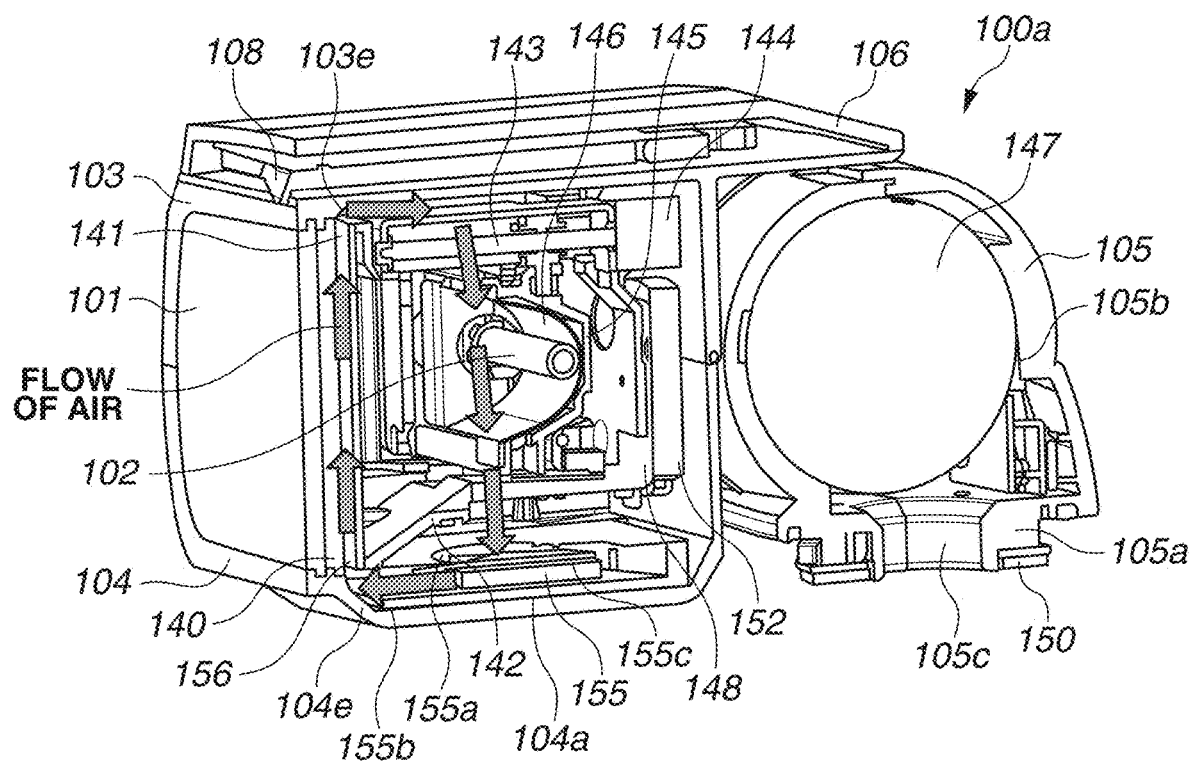
FIG. 9 is a perspective sectional view illustrating a main flow of air in the light emission unit according to the first embodiment.
Figure 10:
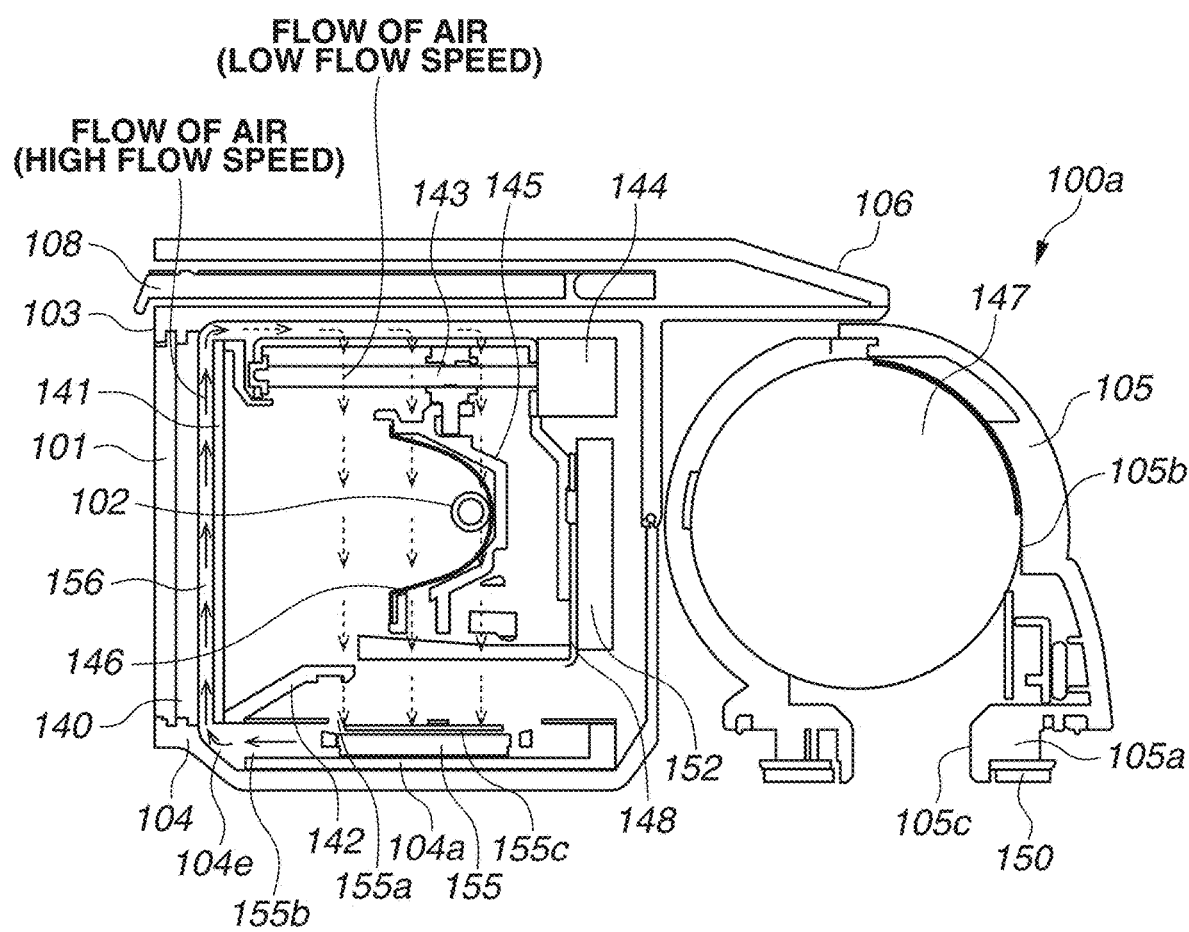
FIG. 10 is a sectional view in which the main flow of the air is indicated by an arrow on a profile curve illustrated in FIG. 9.

Next, a cooling structure of the light emission unit 100a of the present embodiment is described with reference to FIGS. 5 through 9. FIG. 5 illustrates a configuration in which the blower fan 155 is attached to the fan storage portion 104a of the lower cover 104. FIG. 6 illustrates a configuration of an outflow port 103e through which the air flows into the upper cover 103 from the flow path 156. FIG. 7 is a front view of the discharge tube 102 and the blower fan 155. FIGS. 8A and 8B are diagrams illustrating air ventilation ports 142a and 142b of the hood 142. FIG. 9 is a diagram illustrating a main flow of air by using an arrow in a perspective sectional view of the light emission unit 100a. FIG. 10 is a diagram in which the main flow of the air is indicated by an arrow on a profile curve illustrated in FIG. 9. Hereinafter, a description is given of a configuration in which the front glass 154 is removed for further enhancement of cooling efficiency.

The blower fan 155 is fixed to the fan storage portion 104a of the lower cover 104 via an elastic member (not illustrated) for vibration absorption. The blower fan 155 is thermally connected to the lower cover 104. If the blower fan 155 sucks the air heated by light emitted by the discharge tube 102, the blower fan 155 transfers the heat to the lower cover 104, thereby cooling the suctioned air. Since the lower cover 104 is in contact with the outside air, radiation of the transferred heat to the outside air can efficiently cool the suctioned air. The head substrate 148 inside the light emission unit 100a is electrically connected to a fan drive substrate 155c by a wire harness (not illustrated), and the blower fan 155 drives by power supply and a drive control signal. A blade 155d is rotated at high speed, so that the blower fan 155 sucks the air heated by light emitted by the discharge tube 102 from the suction portion 155a, and sends the air from the exhaust portion 155b at higher flow speed.

The acrylic panel 101 is fixed to a groove 103b of the upper cover 103 and a groove 104b of the lower cover 104, whereas the Fresnel lens 140 is fixed to a groove 103c of the upper cover 103 and a groove 104c of the lower cover 104. Moreover, the protection glass 141 is fixed so as to be sandwiched between the upper cover 103 and the lower cover 104 via a shock absorption member 157 attached to both of the upper cover 103 and the lower cover 104. In the front-rear direction (the direction Z), the protection glass 141 is sandwiched between the hood 142 and ribs 103d and 104d for forming the respective grooves 103c and 104c. Thus, the protection glass 141 is spaced a predetermined distance apart from the Fresnel lens 140 depending on thicknesses of the ribs 103d and 104d and is fixed, so that the flow path 156 is formed.

As illustrated in FIG. 9, the air sent from the exhaust portion 155b flows into the flow path 156 while changing a traveling direction from a frontward direction (the direction Z) to an upward direction (the direction Y) at an inflow port 104e formed in the lower cover 104. That is, the blower fan 155 and the inflow port 104e function as an air sending mechanism for sending air in the inner space (the first space), which includes the light source and is provided on the side nearer to the light source than the protection glass 141, to the space (the second space) between the Fresnel lens 140 and the protection glass 141. As long as the blower fan 155 is spaced apart from the inflow port 104e, and a flow path connecting the blower fan 155 to the inflow port 104e is arranged in the lower cover 104, the blower fan 155, the inflow port 104e, and the flow path can function as an air sending mechanism.

As illustrated in FIG. 10, if the air passes through the flow path 156 while a flow speed of the air is being maintained, the heat transferred to the Fresnel lens 140 from the discharge tube 102 via the protection glass 141 can be efficiently cooled. Even if the blower fan 155 sucks the air heated by light emitted by the discharge tube 102, the heat can be radiated by the lower cover 104 as described above. Moreover, temperature of the Fresnel lens 140 heated by light and heat of the discharge tube 102 can often be higher than temperature of the air sent from the blower fan 155. Since a temperature difference between the Fresnel lens 140 and the air sent from the blower fan 155 is sufficiently large, the Fresnel lens 140 can be cooled. Moreover, by bending a flow of the air sent from the blower fan 155 to the substantially orthogonal direction, an overall configuration of the light emission unit 100a can be made smaller.

Herein, it is desired that a width of the space forming the flow path 156 (a width in the direction Z) is substantially equal to an opening width of the exhaust portion 155b of the blower fan 155 in a vertical direction (the direction Y). If the width of the space forming the flow path 156 (the width in the direction Z) is extremely narrow relative to the opening width of the exhaust portion 155b in the vertical direction (the direction Y), a flow path resistance increases, thereby making it difficult for the air to flow. On the other hand, if the width of the space forming the flow path 156 is extremely wide, a flow speed is reduced due to an increase in a cross-sectional area of the flow path. Accordingly, the above configuration is desirable compared to a configuration by which the air in the flow path 156 is sucked by the blower fan 155 and then is exhausted to the space on the side nearer to the light emission unit 139 than the protection glass 141.

Moreover, the Fresnel lens 140 and the protection glass 141 are not necessarily arranged parallel to each other. For example, a width on the inflow side of the flow path 156 can be arranged substantially equal to an opening width of the exhaust portion 155b in the vertical direction (the direction Y), and the width gradually narrows as closer to an outflow side. Thus, a flow path resistance at the time of inflow of air can be minimized, and a flow speed can be maintained until the air flows out. Moreover, as illustrated in FIG. 7, it is desired that a longitudinal direction (a direction X) of the discharge tube 102 and a longitudinal direction (a direction X) of the exhaust portion 155b of the blower fan 155 are substantially the same, and a length of the discharge tube 102 and a length of the exhaust portion 155b in the longitudinal direction (the direction X) are substantially equal. Accordingly, an area that is near an arc length of the discharge tube 102 and in which the Fresnel lens 140 is heated most can be efficiently cooled.

The air having flowed out from the flow path 156 flows into the outflow port 103a while changing a traveling direction from an upward direction (a direction Y) to a rearward direction (a direction Z) at the outflow port 103e formed on the upper cover 103. The air having flowed out to the outflow path 103a passes through the ventilation ports 142a and 142b arranged in the vertical direction (direction Y) of the hood 142. Then, the air absorbs the heat of the discharge tube 102 again, and the heat-absorbed air is sucked by the blower fan 155.

The discharge tube 102 and the Fresnel lens 140 are cooled while the air is being circulated inside as described above, thereby protecting the discharge tube 102 and the Fresnel lens 140. In the above-described configuration, since the air is circulated in a sealed space, cooling and then protection of the discharge tube 102 and the Fresnel lens 140 can be achieved with the dust-proof drip-proof performance retained.

In the present embodiment, an air-sending mechanism (or air-movement mechanism) is arranged on one side (a lower side) of the discharge tube 102, and a storing portion is arranged on the other side (an upper side) of the discharge tube 102. The storing portion stores the wide panel 108 that changes distribution of light emitted from the Fresnel lens 140 in a drawable and retractable manner. That is, with the blower fan 155 arranged on a lower side of the light emission unit 100a, the air flows through the flow path 156 in an upward direction (in a direction Y). However, the blower fan 155 may be arranged on the left side (or the right side) of the light emission unit 100a, so that air can flow through the flow path 156 in the right direction (a direction X) for the left direction (a direction −X)). In such a case, for each of the inflow port 104e, the outflow port 103e, the outflow path 103a, the ventilation port 142a, and the ventilation port 142b is arranged in the right direction (the direction X) (or the left direction (a direction −X)). However, since the configuration according to the present embodiment (i.e., the configuration iii which air flows through the flow path 156 in an upward direction (the direction Y)) enables the flow path 156 to be shorter, a flow speed is maintained more easily and a cooling effect is high.

According to the embodiment, therefore, members related to light emission such as the discharge tube 102 and the Fresnel lens 140 can be protected from heat associated with light emission.

Figure 11:
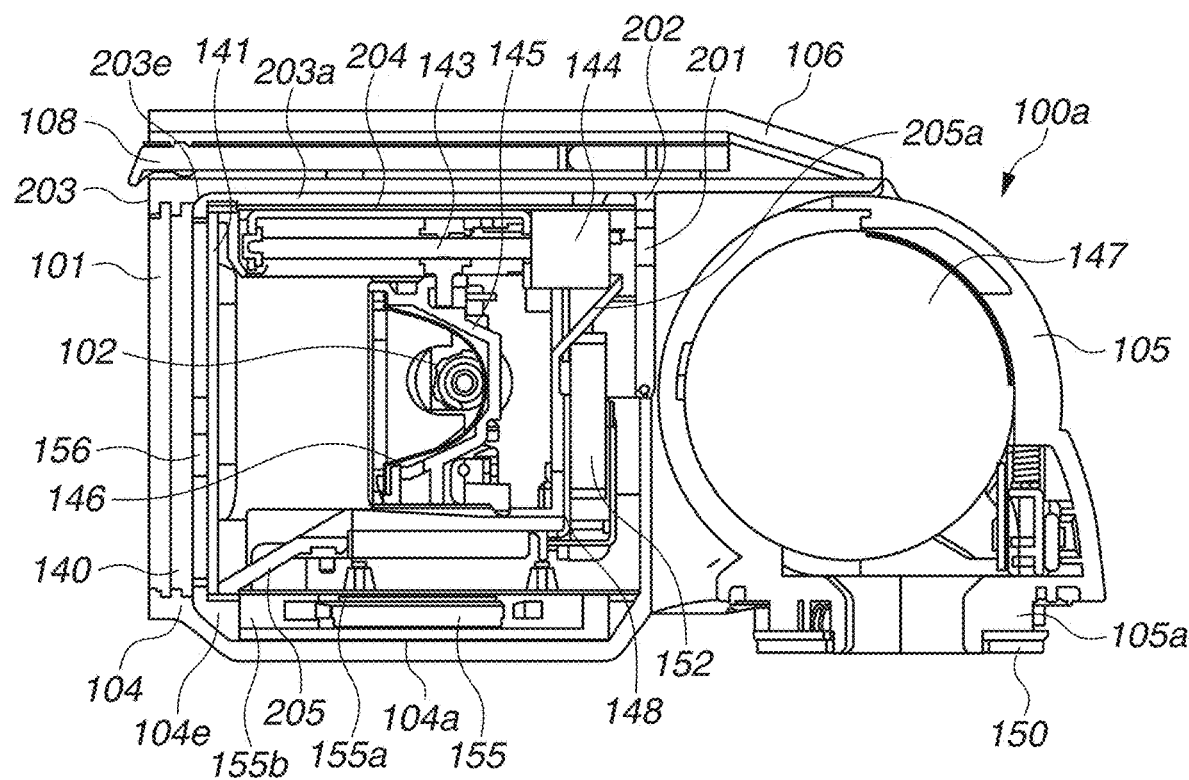
FIG. 11 is a longitudinal sectional view illustrating a light emission unit in a strobe device according to a second embodiment.
Figure 12:
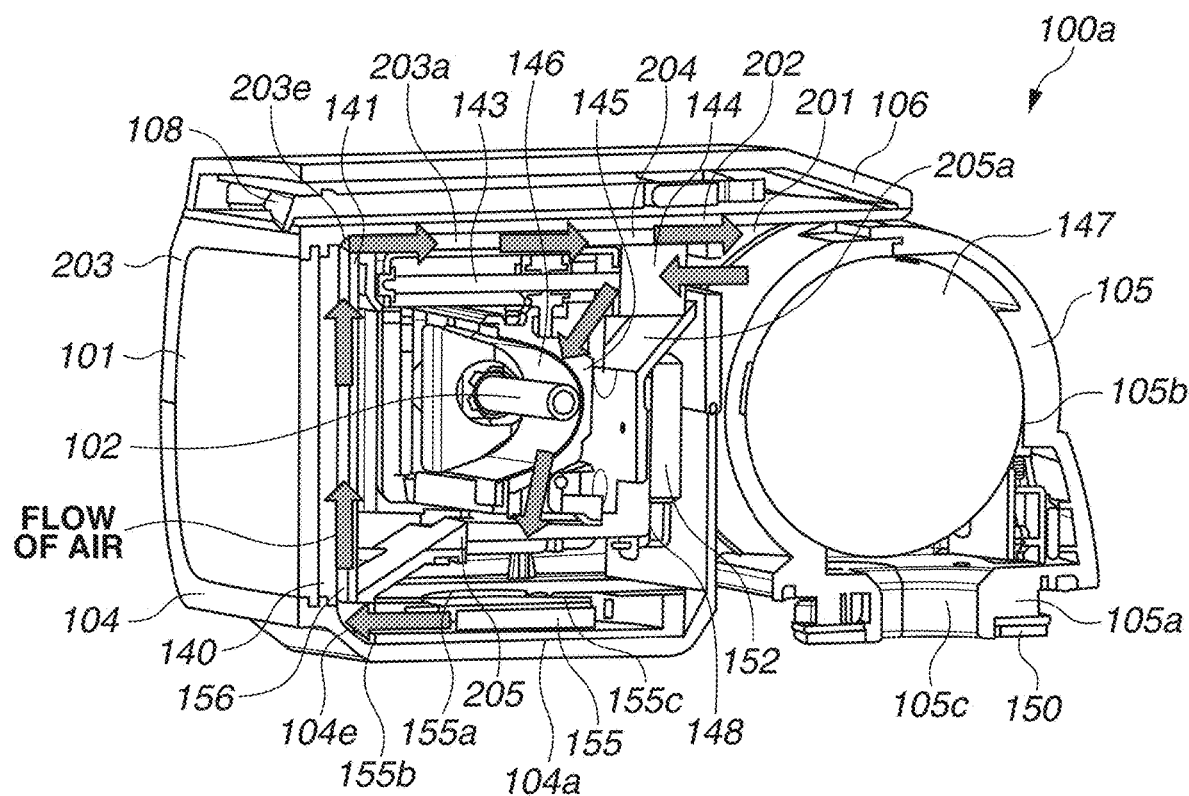
FIG. 12 is a perspective sectional view illustrating a main flow of air in the light emission unit according to the second embodiment.

Hereinafter, a configuration of a strobe device 200 as a lighting device according to a second embodiment is described with reference to FIGS. 11 and 12. In the lighting device of the present embodiment, components that are similar to the first embodiment are given the same reference numerals as above, and descriptions thereof are omitted. The present embodiment differs from the first embodiment in that the strobe device 200 includes a suction port 201 and an exhaust port 202 for sucking air from and exhausting air to the outside thereof to enhance a cooling efficiency. FIG. 11 is a sectional view illustrating a cross section perpendicular to the horizontal direction of the light emission unit 100a inside the strobe device 200. FIG. 12 is a diagram in which a main flow of air is indicated by an arrow in the perspective sectional view of the light emission unit 100a.

Unlike the first embodiment, an upper cover 203 includes the suction port 201 and the exhaust port 202, and the suction port 201 and the exhaust port 202 are partitioned by a separator 204. A ventilation port 205a is arranged in the rear of a hood 205 (on the side near the capacitor 147), and the outside air flowing from the suction port 201 is guided into the hood 205 as illustrated in FIG. 12. A blower fan 155 sucks the air heated by a discharge tube 102 from a suction portion 155a, and radiates heat of the air to a lower cover 104 that is thermally connected to the blower fan 155. Then, the blower fan 155 changes a traveling direction of the air at an inflow port 104e to send the air to a flow path 156 from the exhaust portion 155b. The air having flowed out from the flow path 156 passes through an outflow path 203a surrounded by the upper cover 203 and the separator 204 while changing a traveling direction at an outflow port 203e formed on the upper cover 203. Then, the air is exhausted outside the strobe device 200 from the exhaust port 202.

Accordingly, the outside air is sucked from the suction port 201, and the air heated inside the strobe device 200 is exhausted from the exhaust port 202, thereby protecting members related to light emission such as the discharge tube 102 and the Fresnel lens 140 from the heat associated with light emission.

According to the present embodiment, therefore, the outside air is directly introduced to the light emission unit 100a, so that the discharge tithe 102 is particularly cooled with efficiency. Moreover, the heated air is exhausted from the exhaust port 202, thereby suppressing a temperature rise of the entire light emission unit 100a.

Figure 13:
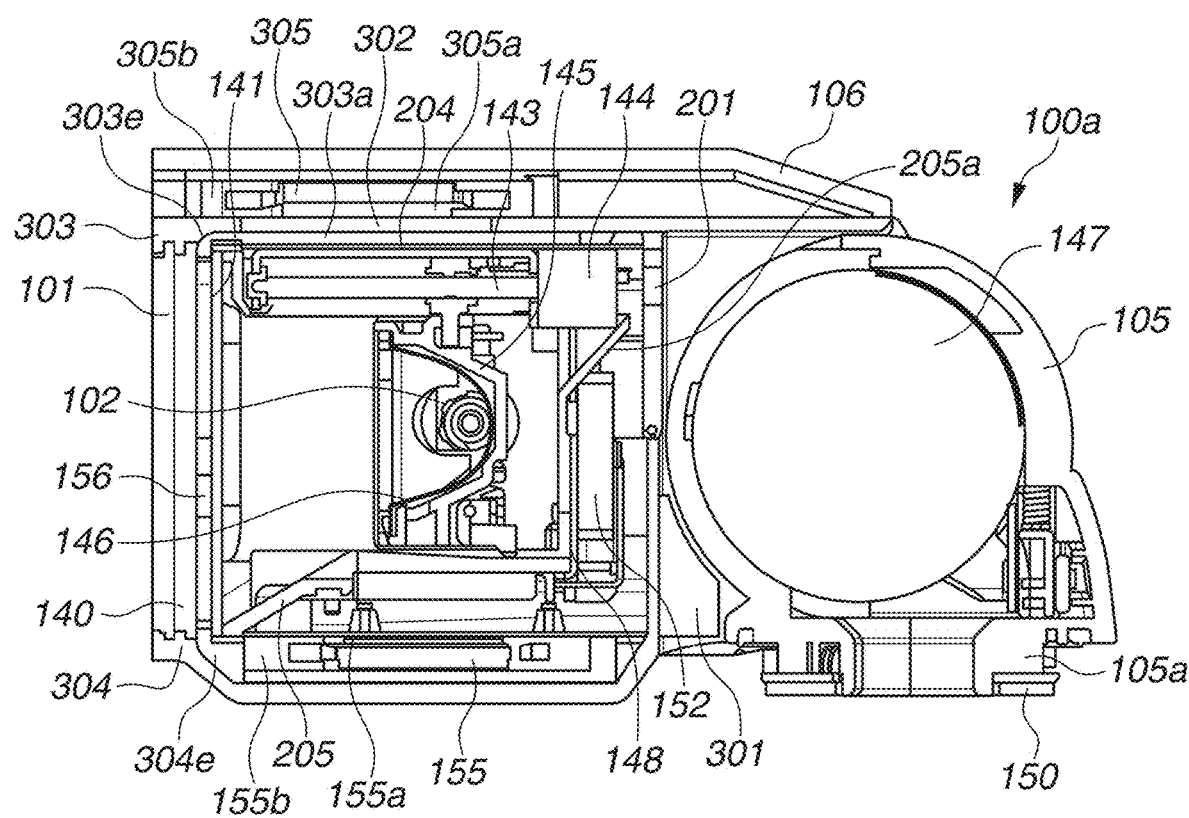
FIG. 13 is a longitudinal sectional view of a light emission unit inside a strobe device according to a third embodiment.
Figure 14:
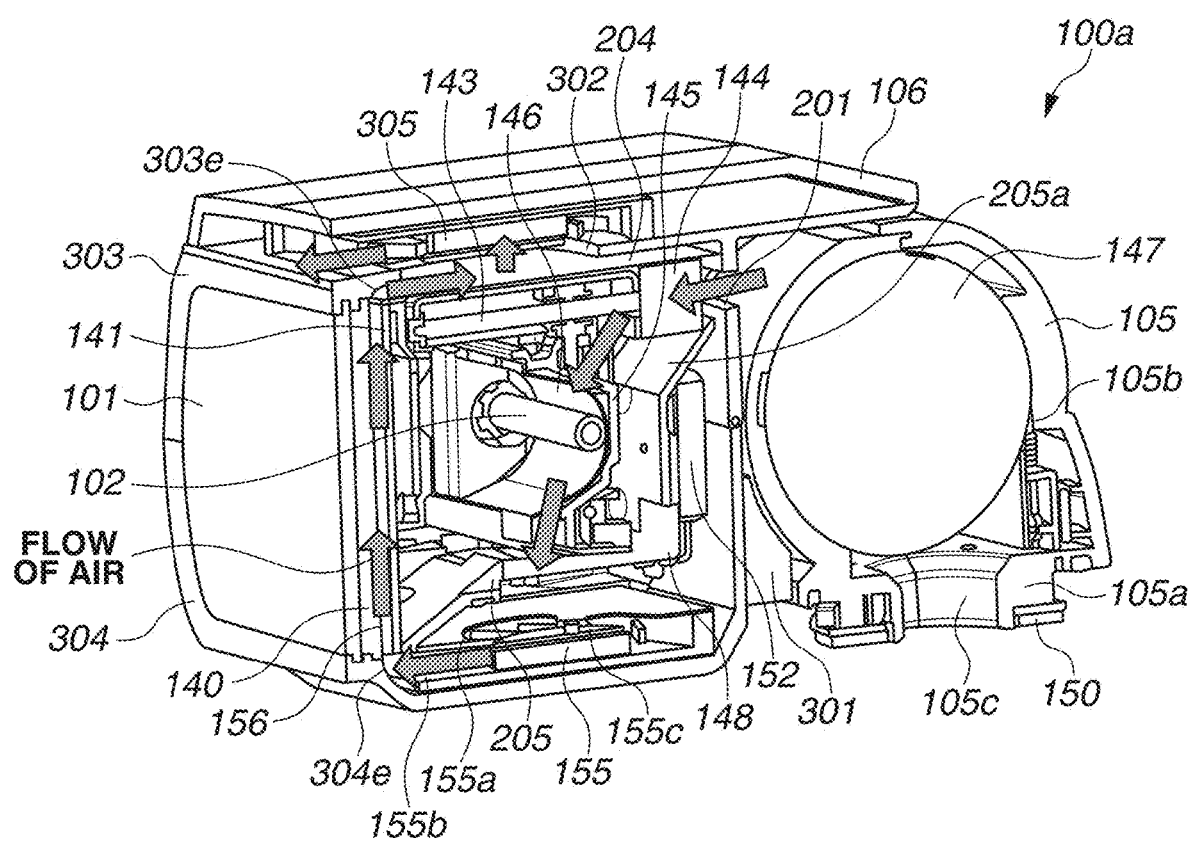
FIG. 14 is a perspective sectional view illustrating a main flow of air in the light emission unit according to the third embodiment.
Figure 15:
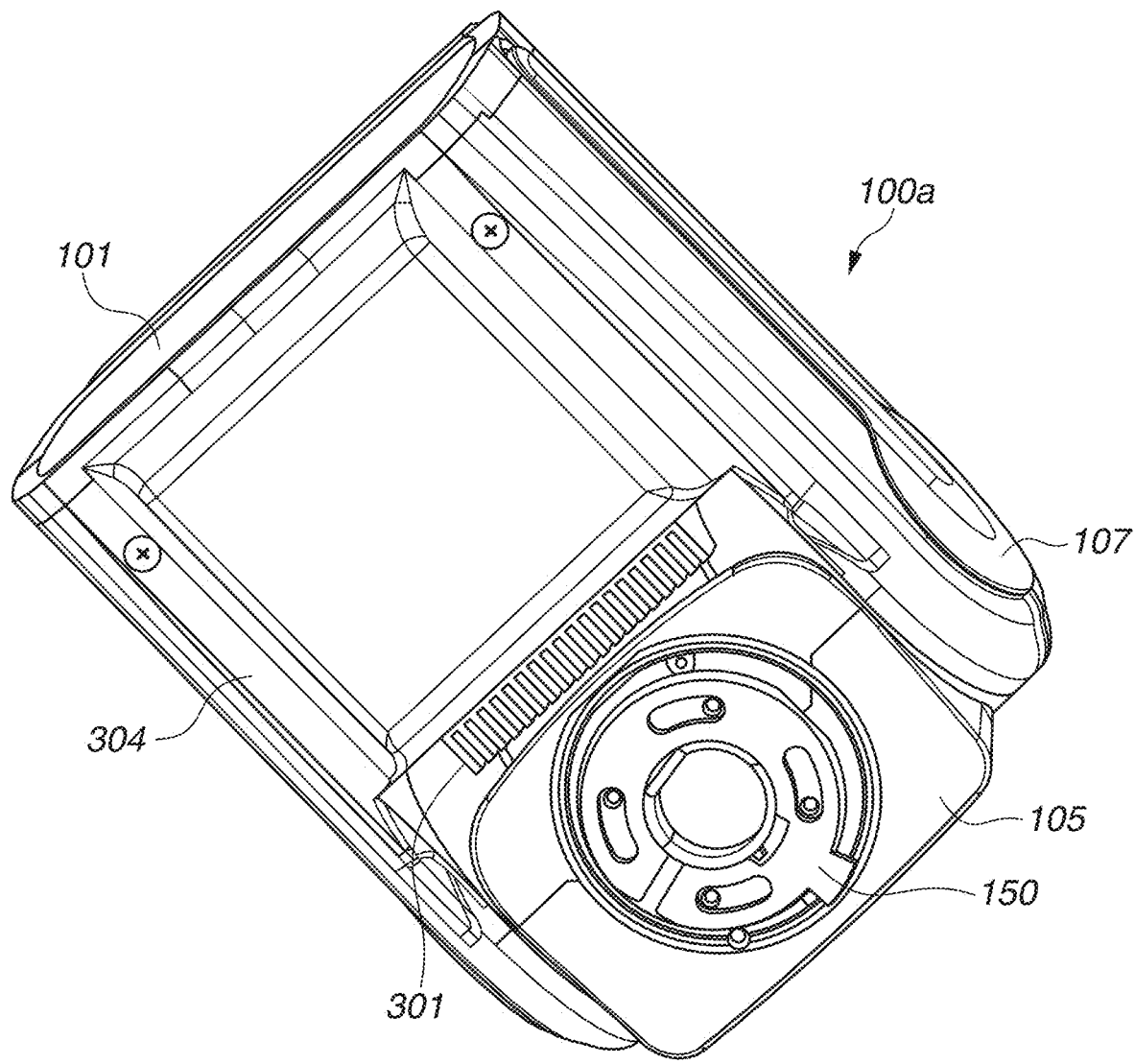
FIG. 15 is a perspective view illustrating a heat radiation fin as seen from a bottom side of the light emission unit according to the third embodiment.

Hereinafter, a configuration of a strobe device 300 as a lighting device according to a third embodiment is described with reference to FIGS. 13 through 15. In the lighting device of the present embodiment, components that are similar to the first and second embodiments are given the same reference numerals as above, and descriptions thereof are omitted. The present embodiment differs from the first and second embodiments in that the strobe device 300 includes a heat radiation fin 301 and an exhaust blower fan 305 to further enhance a cooling efficiency. FIG. 13 is a sectional view illustrating a cross section perpendicular to the horizontal direction of the light emission unit 100a inside the strobe device 300. FIG. 14 illustrates a main flow of air by using an arrow in a perspective sectional view of the light emission unit 100a. FIG. 15 is a perspective view illustrating the heat radiation fin 301 as seen from the bottom side of the light emission unit 100a.

An upper cover 303 includes the suction port 201 and the exhaust hole 302, and the suction port 201 and the exhaust hole 302 are partitioned by a separator 204. A ventilation port 205a is arranged in the rear of the hood 205 (on the side near the capacitor 147), and the outside air flowing from the suction port 201 is guided into the hood 205 as illustrated in FIG. 14. A blower fan 155 sucks (or extracts) the air heated by a discharge tube 102 from a suction portion 155a, and radiates heat of the suctioned air by using the heat radiation fin 301 thermally connected to the blower fan 155. Then, a traveling direction of the air is changed at an inflow port 304e to send the air to a flow path 156 from the exhaust portion 155b.

As illustrated in FIG. 15, the heat radiation fin 301 is a heat radiation unit having a fin shape formed by a technique such as die casting, and is insert-molded on a lower cover 304. The fin shape protrudes outside of the lower cover 304, and a groove is provided in a vertical direction (a direction Y) such that a flow of air in the vertical direction (the direction Y) is not disturbed. According to such a configuration, heat of the air sucked by the blower fan 155 can be efficiently radiated, and heat radiation efficiency of the Fresnel lens 140 can be enhanced by sending the air of which the heat has been efficiently radiated to the flow path 156. The heat radiation fin 301 and the lower cover 304 may be separate components, and the separate components may be incorporated.

The air having flowed out from the flow path 156 flows into an outflow path 303a surrounded by the upper cover 303 and the separator 204 while changing a traveling direction at an outflow port 303e formed on the upper cover 303. The air having flowed into the outflow path 303a is sucked by an exhaust blower fan 305 from a suction portion 305a connected to the exhaust hole 302 formed in an upper portion (in the direction Y) of the outflow path 303a. The exhaust blower fan 305 is similar to the blower fan 155. However, in the present embodiment, the exhaust blower fan 305 is stored in the wide panel cover 106 that is used to store the wide panel 108 in the first and second embodiments. Moreover, the exhaust blower fan 305 is electrically connected to the head substrate 148 by a wire harness (not illustrated). Similar to the blower fan 155, rotation of the exhaust blower fan 305 is controlled based on a PWM signal by a CPU 130 of a control unit 100b via the head substrate 148. The suction portion 305a of the exhaust blower fan 305 is arranged on the side near a light emission unit 139, and sucks the air heated through the flow path 155 from the exhaust hole 302. The air suctioned from the suction portion 305a is exhausted toward the outside of the strobe device 300 from an exhaust portion 305b toward a direction (a direction Z) same as an irradiation direction. Accordingly, the outflow port 303e, the outflow path 303a, and the exhaust blower fan 305 function as a second air-sending mechanism for sending the air having flowed through a space between the Fresnel lens 140 and a protection glass 141 to the outside of the strobe device 300.

As described above, the blower fan 155 sucks the heated air in the vicinity of the discharge tube 102, the heat radiation fin 301 radiates heat of the suctioned air, and the exhaust blower fan 305 exhausts the air that has absorbed heat of the Fresnel lens 140 to the outside of the strobe device 300. Therefore, a member related to light emission such as the discharge tube 102 and the Fresnel lens 140 can be protected from heat associated with light emission.

According to the present embodiment, as described above, the air of which the heat is radiated by the heat radiation fin 301 is sent to the flow path 156, thereby enhancing a cooling effect on the Fresnel lens 140. Moreover, arrangement of the blower fan 155 and the exhaust blower fan 305 enables the air inside the light emission unit 100a to be further circulated to enhance a heat radiation effect, thereby enhancing a cooling effect.

Figure 16:
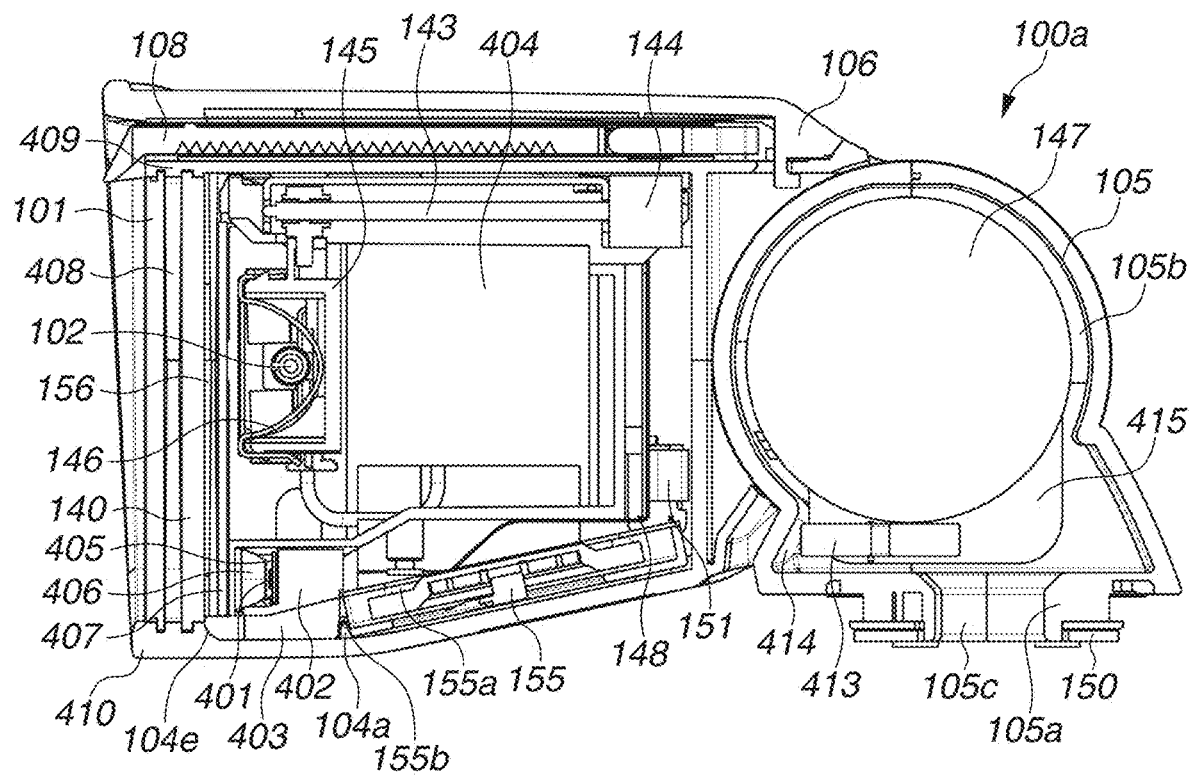
FIG. 16 is a longitudinal sectional view of a light emission unit inside a strobe device according to a fourth embodiment.

Hereinafter, a configuration of a strobe device 400 as a lighting device according to a fourth embodiment is described with reference to FIG. 15. In the lighting device of the present embodiment, components that are similar to those in the first through third embodiments are given the same reference numerals as above, and descriptions thereof are omitted. In the present embodiment, the strobe device 400 includes a light emitting diode (LED) 401 that can be used as a modeling light for composition checking, a video light that is used at the time of moving-image capturing, and an AF auxiliary light. A flow path 403 from a blower fan 155 toward a flow path 156 is formed by a LED heat radiation unit 402 that radiates heat of the LED 401. Thus, the present embodiment differs from the first through third embodiments in that heat transferred to a Fresnel lens 140 and the LED heat radiation unit 402 can be cooled at the same time. FIG. 16 is a sectional view illustrating a cross section perpendicular to a horizontal direction of a light emission unit 100a inside the strobe device 400.

As similar to the strobe device 100 of the first embodiment, the strobe device 400 of the present embodiment is configured such that air is circulated within the strobe device 400.

The LED 401 is arranged in a lower portion of a hood 404 and mounted on an LED substrate 405. The LED substrate 405 is positioned and fixed to the LED heat radiation unit 402, and the LED substrate 405 and the LED heat radiation unit 402 are thermally connected to each other via a thermal conductivity material such as grease. The LED substrate 405 is desirably an aluminum substrate having good heat transfer property.

The LED heat radiation unit 402 is made of a thermal conductive material such as an aluminum die-cast having good heat transfer property. The LED heat radiation unit 402 forms an upper surface and a side surface of the flow path 403 that rectifies the air sent from the blower fan 155 and guides the rectified air to the flow path 156. The flow path 403 will be described in detail below.

As similar to the LED 401, an LED lens 406 is arranged in a lower portion of the hood 404. The LED lens 406 is positioned together with the LED heat radiation unit 402 with respect to the hood 404, so that an LED light axis of the LED 401 and an LED light axis of the LED lens 406 match.

A length of a protective glass 407 in a vertical direction is shorter than that of the acrylic panel 101 or the Fresnel lens 140, and an upper portion of the protective glass 407 is notched in a range in which an effective range of light emitted from the discharge tube 102 can be covered. Thus, the air having flowed through the flow path 156 can flow out to the hood 404 from the upper portion of the protective glass 407.

An air layer 408 is formed between the acrylic panel 101 and the Fresnel lens 140 to suppress a temperature rise of the acrylic panel 101. The acrylic panel 101 and the Fresnel lens 140 are fixed by an upper cover 409 and a lower cover 410, and such fixation determines a width of the air layer 408.

A choke coil 413 is arranged in a choke coil storage unit 414 inside a bounce case 105. The choke coil 413 is electrically connected to the head substrate 148 by a wire harness (not illustrated) via a coil fixation board 415. The choke coil 413 is fixed to the capacitor 147 or the choke coil storage unit 414 to prevent vibration that is generated when an electric current flows to the choke coil 413. Unlike each of the first through third embodiments, the arrangement of the choke coil 413 in the choke coil storage unit 414 enables an installation space of the head substrate 148 to be secured and the size of the head substrate 148 to be reduced.

Figure 17:
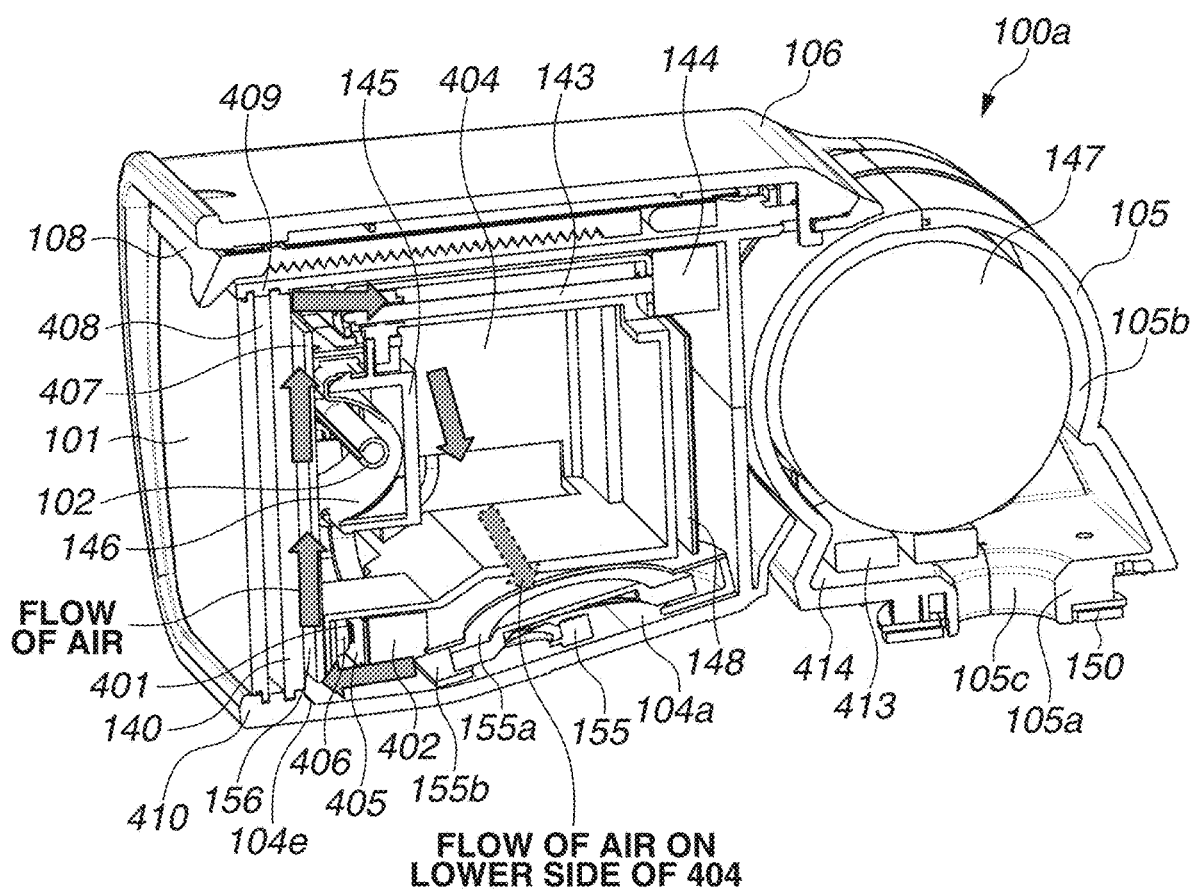
FIG. 17 is a perspective sectional view illustrating a main flow of air in the light emission unit according to the fourth embodiment.
Figure 18:
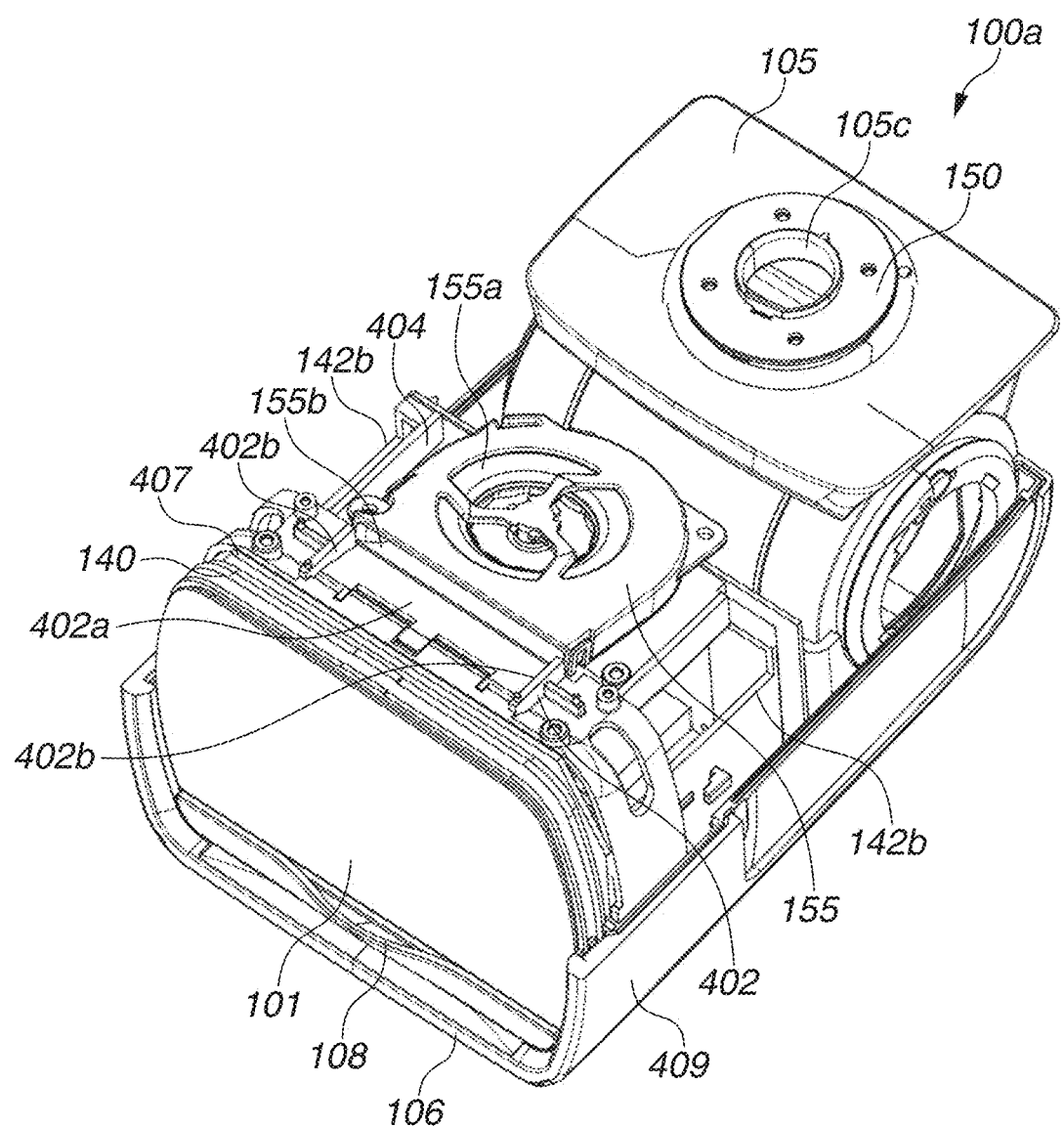
FIG. 18 is a perspective view illustrating a flow path inside the light emission unit according to the fourth embodiment.

Next, a cooling structure of the light emission unit 100a of the present embodiment is described with reference to FIGS. 17 and 18. FIG. 17 illustrates a main flow of air by using an arrow in a perspective sectional view of the light emission unit 100a. FIG. 18 is a perspective view illustrating the flow path 403 inside the light emission unit 100a.

In a fan storage portion 104a of the lower cover 410, the blower fan 155 is fixed with a screw such that a clearance is provided between the blower fan 155 and the lower cover 410. The blower fan 155 sucks the air heated by light emitted by the discharge tube 102 from the suction portion 155a. Herein, the air is suctioned from both sides in the vertical direction (the direction Y) of the blower fin 155. Then, the blower fan 155 sends the air from the exhaust portion 155b at a higher flow speed. The air sent from the exhaust portion 155b is rectified (or cooled to reduce the air temperature) in the flow path 403, and a traveling direction of the air is changed from a frontward and downward direction (a direction −YZ) to a frontward direction (a direction Z). Subsequently, the air flows into the flow path 156 while changing the traveling direction from the frontward direction (the direction Z) to an upward direction (the direction Y) at an inflow port 104e formed on the lower cover 410. Accordingly, although an air-sending direction of air from the exhaust portion 155b and the traveling direction of air in the flow path 156 make an acute angle, a flow path resistance can be minimized.

The flow path 403 is surrounded by a flow path upper surface 402a, a rectification plate 402b, and the lower cover 410. The flow path upper surface 402a and the rectification plate 402b are integrally molded with the LED heat radiation unit 402. The flow path upper surface 402a has an inclination such that the height thereof in the vertical direction becomes narrower. With such an inclination, the flow path upper surface 402a can be smoothly connected to the inflow port 104e. A flow of air sent from the exhaust portion 155b while being biased toward a centrifugal direction of the blower fan 155. In such a case, the rectification plate 402b regulates such a flow of air in a horizontal direction, and provides a rectification effect (or cooled to reduce the temperature of the air that is removed by blower fan 155). In FIG. 18, the rectification plate 402b is arranged on only each of the right and left sides of the flow path 403. However, a plurality of rectification plates 402b may be arranged inside the flow path 403 to enhance a rectification effect.

The integral molding of the flow path upper surface 402a and the rectification plate 402b with the LED heat radiation unit 402 enables heat of the LED 401 to be cooled via the LED heat radiation unit 402 by the air sent from the blower fan 155. Even in a case where the air to be sent is warmed by the LED heat radiation unit 402, the heat received by the Fresnel lens 140 from the discharge tube 102 is greater, and there is a sufficient temperature difference, thereby not greatly affecting cooling of the Fresnel lens 140.

The air having cooled the Fresnel lens 140 in the flow path 156 flows out to the hood 404 from a clearance formed by a notch in an upper portion of the protective glass 407. In the hood 404, the air having flowed into the hood 404 passes through a ventilation port 142b in a lower portion of the hood 404 while adsorbing heat from the discharge tube 102 or the periphery of the discharge tube 102, and is sucked again by the blower fan 155.

As described above, the configuration of the LED heat radiation unit 402 forming one portion of the flow path 403 enables cooling of the LED 401 as well as the discharge tube 102 and the Fresnel lens 140, thereby enabling protection of the discharge tube 102, the Fresnel lens 140, and the LED 401. Moreover, since the air is circulated within the sealed space as similar to the first embodiment, cooling and protection of the discharge tube 102, the Fresnel lens 140, and the LED 401 can be achieved with the dust-proof drip-proof performance retained.

According to the present embodiment, therefore, the discharge tube 102 and the Fresnel lens 140 can be cooled at the same time by the air sent from the blower fan 155 via the LED heat radiation unit 402.

Each of the above-described embodiments is merely one example of a typical example. Various modifications or changes and omissions can be made with respect to each of the embodiments, and each of the embodiments can be combined. For example, the heat radiation fin 301 of the third embodiment can be combined with a configuration of the first embodiment.

Moreover, each of the embodiments has been described using a configuration in which a discharge tube serves as a light source of a lighting device. However, an LED may serve as the light source of the lighting device.

Moreover, each of the embodiments has been described using a configuration in which a fan is used for air suction and air-movement. However, for example, a pump can be used as long as it has an air-movement mechanism for sucking (drawing, pulling or extracting) and moving air.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Applications No. 2018-076459, filed Apr. 11, 2018, and No. 2019-021989, filed Feb. 8, 2019, which are hereby incorporated by reference herein in their entirety.

What is claimed is:

1. A lighting device comprising:
   a light source;
   a first optical member configured to transmit light emitted by the light source;
   a second optical member, arranged between the light source and the first optical member, configured to transmit light emitted by the light source; and
   an air-movement mechanism configured to move air suctioned from a first space to a second space, the first space being an inner space of the lighting device that is nearer to the light source than the second optical member and, the second space being a space between the first optical member and the second optical member.

2. The lighting device according to claim 1, wherein the first optical member is an optical lens that changes distribution of the light emitted by the light source.

3. The lighting device according to claim 1, wherein the second optical member is arranged with a predetermined distance from the first optical member in an irradiation optical axis direction of the lighting device.

4. The lighting device according to claim 1, further comprising a driving mechanism configured to change a relative position of the light source to the first optical member in an irradiation optical axis direction of the lighting device,
   wherein, if the relative position of the light source to the first optical member in the irradiation optical axis direction is changed by the drive mechanism, a relative position of the first optical member to the second optical member in the irradiation optical axis direction is not changed.

5. The lighting device according to claim 1, wherein the air-movement mechanism is configured to move air to the second space by moving air in a direction perpendicular to a longitudinal direction of the light source.

6. The lighting device according to claim 1, wherein the air-movement mechanism is arranged such that a longitudinal direction of an air-moving port of the air-movement mechanism is a same direction as a longitudinal direction of the light source.

7. The lighting device according to claim 1, wherein the air having flowed through the second space is exhausted to the first space.

8. The lighting device according to claim 1, wherein the air having flowed through the second space passes through a flow path arranged along the second space and is exhausted to an outside of the lighting device.

9. The lighting device according to claim 8, further comprising a second air-movement mechanism configured to send the air having flowed through the second space to the outside of the lighting device.

10. The lighting device according to claim 1, further comprising a heat radiation unit thermally connected to the air-movement mechanism.

11. The lighting device according to claim 1, wherein the air-movement mechanism includes a fan.

12. The lighting device according to claim 11, wherein the air-movement mechanism includes a blower fan.

13. The lighting device according to claim 1, wherein the air-movement mechanism is arranged on one side of the light source, and a storage unit is arranged on an other side of the light source, wherein the storage unit is configured to store a third optical member for changing distribution of light emitted from the first optical member in a drawable and retractable manner.

14. The lighting device according to claim 1, further comprising:
   a light emitting diode (LED);
   an LED substrate on which the LED is mounted; and
   an LED heat radiation unit thermally connected to the LED substrate,
   wherein a flow path of air sent from the air-movement mechanism is formed by using one portion of the LED heat radiation unit.

15. A device comprising:
   a light source;
   a first optical member configured to transmit light emitted by the light source;
   a second optical member, arranged between the light source and the first optical member, configured to transmit light emitted by the light source; and and air-movement mechanism ocnfigured to be arranged between a first space and a second space and to move air between the first space and the second space, the first space being an inner space of the device that is nearer to the light source than the second optical member and, the second space being a space between the first optical member and the second optical member.

16. The device according to claim 15, wherein the first optical member is an optical lens that changes distribution of the light emitted by the light source.

17. The device according to claim 15, wherein the second optical member is arranged with a predetermined distance from the first optical member in an irradiation optical axis direction of the device.

18. The device according to claim 15, further comprising a driving mechanism configured to change a relative position of the light source to the first optical member in an irradiation optical axis direction of the device,
   wherein, if the relative position of the light source to the first optical member in the irradiation optical axis direction is changed by the drive mechanism, a relative position of the first optical member to the second optical member in the irradiation optical axis direction is not changed.

19. The device according to claim 15, wherein the air-movement mechanism is configured to move air to the second space by moving air in a direction perpendicular to a longitudinal direction of the light source.

20. The device according to claim 16, wherein the air-movment mechanism is arranged such that a longitudinal direction of an air-moving port of the air-movement mechanism is a same direction as a longitudinal direction of the light source.

* * * * *